US005682949A

United States Patent [19]
Ratcliffe et al.

[11] Patent Number: 5,682,949
[45] Date of Patent: Nov. 4, 1997

[54] ENERGY MANAGEMENT SYSTEM

[75] Inventors: Edward L. Ratcliffe, Kawata; Iain Page, Ottawa; Anwar Chami, Gatineau, all of Canada

[73] Assignee: Globalmic, Inc., Ottawa, Canada

[21] Appl. No.: 63,465

[22] Filed: May 18, 1993

[30] Foreign Application Priority Data

May 22, 1992 [CA] Canada ................... 2069273

[51] Int. Cl.$^6$ ........................... F25B 29/00
[52] U.S. Cl. .............. 165/209; 165/237; 236/49.3; 236/51; 236/1 B; 236/1 C; 340/825.06; 364/505
[58] Field of Search .............. 165/12, 22; 236/49.3, 236/51, 1 B, 1 C; 340/825.06; 364/505

[56] References Cited

U.S. PATENT DOCUMENTS

| | | | |
|---|---|---|---|
| 4,174,064 | 11/1979 | Pratt, Jr. ................... | 236/51 |
| 4,284,126 | 8/1981 | Dawson ................... | 236/51 |
| 4,346,755 | 8/1982 | Alley et al. ................ | 165/27 |
| 4,441,545 | 4/1984 | Alley et al. ................ | 165/26 |
| 4,997,029 | 3/1991 | Otsuka et al. .............. | 236/51 |
| 5,165,465 | 11/1992 | Kenet ...................... | 165/12 |
| 5,279,458 | 1/1994 | DeWolf et al. .............. | 236/51 |
| 5,311,451 | 5/1994 | Barrett ..................... | 165/12 |

FOREIGN PATENT DOCUMENTS 3-99156  4/1991  Japan ...................... 236/51

OTHER PUBLICATIONS

Key Systems for Commercial Buildings Carrier Corp 1986 pp. 1–45.

*Primary Examiner*—John K. Ford
*Attorney, Agent, or Firm*—Dority & Manning

[57] ABSTRACT

This document describes an energy management system in which microprocessor based thermostats are used to control individual room temperatures in a multiple room building in accordance with the known occupancy status of the room. The occupancy status information, as well as other control parameters, are transmitted to the thermostats from a central computer program. The control of a heating and cooling appliances is performed by an algorithm running on the electronic thermostat, which performs this function in accordance with these downloaded parameters. The system, allows room occupants to control the temperature of an occupied room within preset limits, automatically limits energy usage in unoccupied rooms, and provides additional facilities for energy management and general building management.

1 Claim, 47 Drawing Sheets

ENERGY MANAGEMENT SYSTEM CONTROL SCREEN

EMS COPYRIGHT (c) 1991 BY GLOBALMIC INC.

| | | | |
|---|---|---|---|
| [b] | −SET BIAS TEMPERATURE | [r] | −RESET |
| [c] | −ENABLE/DISABLE COOL | [s] | −STATUS |
| [d] | −SET DEFAULT TEMPERATURE [17] | [t] | −ENABLE/DISABLE THEFT |
| [e] | −RESET SET TEMPERATURES | [u] | −CHECKOUT ROOM |
| [h] | −ENABLE/DISABLE HEAT | [y] | −SET HYSTERESIS [02] |
| [l] | −PEAK LOAD PERCENTAGE [90] | [ESC] | −EXIT |
| [m] | −SET MAXIMUM TEMPERATURE [26] | [F2] | −SET ROOM TEMP |
| [n] | −SET MINIMUM TEMPERATURE [16] | [F3] | −START LOGGING |
| [o] | −CHECKIN ROOM | [F4] | −STOP LOGGING |
| [p] | −ENABLE/DISABLE PAY TV | [F5] | −TEMPERATURE COMPARE |
| [F6] | −REPROGRAM SYSTEM | [F7] | −REPROGRAM BY SERIAL NO. |

FIG. 13C

MANAGEMENT SYSTEM MONITOR SCREEN

EMS COPYRIGHT (c) 1991 BY GLOBALMIC INC.

| 101 | 24 17↓00 | 121 | 24 17↓00 | 231 | 22 17⊠00 | 361 | 24 17⊠ 00 | 581 | 22 17⊠00 |
|---|---|---|---|---|---|---|---|---|---|
| 102 | 24 17 00⇧ | 122 | 24 17↓00 | 232 | 27 17↓00 | 362 | 24 17↓ 00 | 582 | 24 17↓00 |
| 103 | 23 17↓00 | 123 | 24 17↓00 | 233 | 24 17↓00 | 363 | 24 17↓ 00 | 583 | 24 17↓00 |
| 104 | 25 17 00⇧ | 124 | 24 17↓00 | 234 | 24 17↓00 | 364 | 23 17↓ 00 | 584 | 24 17↓00 |
| 105 | 23 17↓00 | 125 | 24 17↓00 | 235 | 23 17↓00 | 465 | 23 17⊠ 00 | 585 | 23 17↓00 |
| 106 | 24 17 00⇧ | 126 | 23 17↓00 | 236 | 23 17↓00 | 466 | 23 17↓ 00 | 586 | 25 17↓00 |
| 107 | 23 17↓00 | 127 | 23 17↓00 | 237 | 24 17↓00 | 467 | 23 17⊠ 00 | 587 | 23 17↓00 |
| 108 | 22 25⊠00⇧ | 128 | 26 17↓00 | 238 | 23 17⊠00 | 468 | 25 17↓ 00 | 588 | 23 17↓00 |
| 109 | 23 17↓00 | 129 | 24 17↓00 | 349 | 22 17↓00 | 469 | 23 17↓ 00 | 689 | 25 28⊠00⊠ |
| 110 | 23 17↓00 | 130 | 23 17↓00 | 350 | 22 17⊠00 | 470 | 23 17↓ 00 | 690 | 25 17⊠00 |
| 111 | 23 17↓00 | 241 | 25 17↓00 | 351 | 22 17↓00 | 471 | 23 17↓ 00 | 691 | 24 17↓00 |
| 112 | 24 17↓00 | 240 | 24 17↓00 | 352 | 23 17⊠00 | 472 | 24 17↓ 00 | 692 | 24 17↓00 |
| 113 | 24 25⊠00⇧ | 239 | 24 17↓00 | 353 | 23 17⊠00 | 573 | 25 17↓ 00 | 693 | 23 17⊠00 |
| 114 | 25 17↓00 | 242 | 24 17↓00 | 354 | 24 17↓00 | 574 | 23 17⊠ 00 | 694 | 25 17↓00 |
| 115 | 25 17↓00 | 243 | 23 17↓00 | 355 | 25 17↓00 | 575 | 22 17⊠ 00 | 695 | 26 17↓00 |
| 116 | 24 24 00⇧ | 244 | 23 17⊠00 | 356 | 23 17↓00 | 576 | 25 17↓ 00 | 696 | 23 17↓00 |
| 117 | 23 17↓00 | 245 | 23 17⊠00 | 357 | 25 17↓00 | 577 | 23 17⊠ 00 | | |
| 118 | 24 17↓00 | 246 | 24 17↓00 | 358 | 23 17↓00 | 578 | 23 17↓ 00 | | |
| 119 | 24 17↓00 | 247 | 22 17↓00 | 359 | 24 17↓00 | 579 | 24 17↓ 00 | | |
| 120 | 23 17↓00 | 248 | 21 17⊠00 | 360 | 24 17↓00 | 580 | 24 17↓ 00 | | |

F1 HELP    F2 UPDATE    ESC EXIT

FIG. 13D

EXPLANATION OF ENERGY MANAGEMENT
SYSTEM MONITOR SCREEN

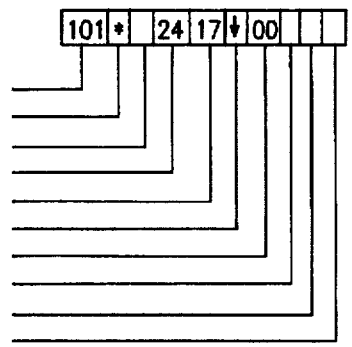

(A) ROOM ID AND OCCUPANCY STATUS
(B) THEFT ALARM INDICATOR
(C) PAY TV INDICATOR
(D) MAIN ROOM AMBIENT TEMPERATURE
(E) SET TEMPERATURE
(F) MAIN ROOM APPLIANCE STATUS
(G) OTHER ROOM AMBIENT TEMPERATURE
(H) OTHER ROOM APPLIANCE STATUS
(I) COOL AND HEAT DISABLES
(J) HOUSEKEEPING STATUS

FIG. 13E

HOTEL MANAGEMENT SOFTWARE SCREEN

16:10:42 NOVEMBER, 06-1991
91/11/06

01) CHECKIN
02) CHECKOUT
03) LIST OCCUPIED ROOMS
04) LIST STATUS OF ROOMS
05) LIST OCCUPIED ROOMS BY NAME
06) ADD CHARGES
07) RESERVATION
08) LIST RESERVATION BY ROOM
09) LIST RESERVATION BY DATE
10) CHANGE RESERVATION
11) CLEAR WAKEUP CALL
12) CREATE WAKEUP CALL
13) LIST WAKEUP CALLS
14) LIST TELEPHONE CHARGES
15) CHANGE CHECKED IN CLIENT
16) CHANGE CLIENT
ENTER YOUR SELECTION

17) LIST RESERVATIONS BY DATE RANGE
18) ADJUST CHARGES
19) REPORTS
20) ROOM HAS BEEN CLEANED
21) LIST RESERVED ROOMS
22) LIST VACANT ROOMS
23) SIGNOFF
24) SHIFT CLOSEOUT
25) CLIENTS WITH OUTSTANDING BALANCE
26) AVAILABILITY OF ROOMS
27) ADD A TELEPHONE CHARGE
28) CHANGE COLORS
29) CANCEL CLIENT
30) RE-CHECKIN CLIENT
31) PASSWORD MAINTENANCE
32) ENERGY MANAGEMENT SYSTEM UPDATES
33) EXIT

F8 – NO      F9 – YES      F10 – CANCEL

FIG. 13F

ENERGY MANAGEMENT SYSTEM

The present invention relates, generally, to energy management systems and, more specifically, to energy management systems for use in multiple room establishments such as hotels and motels.

BACKGROUND OF THE INVENTION

The control of heating and cooling energy in multi-room buildings such as hotels and motels is normally achieved through the use of independent thermostats in every room. The mount of energy used in any room within a such a building is generally determined by the occupant who has no incentive to conserve energy by reducing the thermostat setting when vacating the room. As a result, the costs associated with energy usage in such cases are much higher than required to ensure the comfort of the occupants. While manual control of individual thermostats by building staff could help reduce energy usage, the cost of labour associated with continually adjusting all thermostats in a building complex offsets the savings and makes this option rather impractical.

The use of electronic microprocessor based thermostats to control heating and cooling equipment in multiple dwelling buildings offers a solution to this problem. Such devices offer an advantage over traditional thermostats in that these devices can be programmed to perform energy saving functions such as cycling the operation of heaters and air conditioners in accordance with a preprogrammed schedule. U.S. Pat. No. 4,382,544 describes the design of an electronic thermostat that accomplishes an energy management function through the use of a preprogrammed schedule. A limitation of this device is that it is designed to follow a specific schedule and cannot react to the change in the occupancy status of a room.

Devices such as that described in U.S. Pat. No. 4,623,969 provide facilities for monitoring ambient light conditions and occupant motion and then use this information to determine whether the room is occupied. If the room is determined to be unoccupied, heating or cooling equipment can be turned off to limit energy usage. While this approach provides an advantage over preprogrammed schedule type devices, there are a number of disadvantages. For example, the room temperature may not be maintained at a comfort level if the room occupant is out of range of the motion detector or the lights are turned off in the room while the occupant is resting, energy may be wasted heating or cooling the room if the previous occupant or cleaning staff leave the light on in an unoccupied room, or the room curtains are moving in response to incoming air from a ventilation duct, and if the occupants vacate their rooms for an hour or two, the room temperature will not be maintained at a comfort level for when they return.

Existing microprocessor based devices that are used in distributed control systems and in automated monitoring and control systems for buildings have the capability of sending and receiving information through a common communication link to a central computer, and running local control programs in accordance with received information. These devices are suitable for providing control over sections or functions within a building, but may not be practical for use in individual rooms of a multiple room dwelling such as a motel or hotel where physical size, installation cost, and wiring restrictions are major considerations. Additionally, because devices such as that described in U.S. Pat. No. 4,497,031 are designed to handle a number of remote temperature sensing and control points rather than concentrating on the control of a single room or suite, they cannot provide an easy mechanism for room occupants to set the desired temperature. A further drawback of such an approach is that, when used in hotel, motel or similar multiple room building, a device failure will result in a loss of control of the heating and cooling functions of a number of rooms within an area.

U.S. Pat. No. 4,497,031 granted to Johnson Service Company on Jun. 29, 1985 discloses an energy control system which comprises a centralized headend computer at a first hierarchial level, a plurality of data processing units at a second level and a plurality of system controllers at a third level. The data processing units serve to check and verify information passing between the headend computer and the system controllers. The headend unit may incorporate an operator display panel and computer programs for demand load control of the system controllers. It is also responsive to the conditions of all field data points connected to it via the system controllers and may effect a reduction in output and/or an orderly shutdown of predetermined functions within any of several data zones for overall demand limiting purposes. The system controllers are connected to one of more units such as air handling units, air conditioning units and the like for a space such as a room or a plurality of adjacent rooms within a building. The space may be provided with a temperature sensor for providing a voltage signal to the system controller. The patent does not appear to provide a thermostat for each room. In other words, in a system in which the system controllers control an entire floor consisting of, say, seven rooms, there would be only one sensor for the entire floor. Each system controller consists of a number of circuit boards which communicate through a communication backplane within the controller enclosure. These boards consist of an Intel 8088 processor board and a number of 8049 based peripheral boards, a sixteen key keypad and a six digit display to allow an operator to modify various program parameters or choose which of a number of mnemonically identified programs are to be running on the controller. In a typical application, then, remote temperature sensors and relays would be connected to the system controller through field wiring which would enter the system controller enclosure as a bundle of wires.

There are a number of major disadvantages to the Johnson system. First, the system controller is of the same level of complexity as a personal computer, such as, for example an IBM-PC and could be expected to have a cost in keeping with it. In a building application, it is clear that it would not be practical to install such a unit in each room. One such unit per floor would be more practical.

Second, the operator interface on each system controller would make it possible to start any one of a number of programs running on the floor (or zone). The desired parameters within the system could be modified as required. Such modifications, however, would have to be made by authorized personnel and could not be made by room occupants. In a large system, it would be rather inconvenient to have to service each system controller individually.

Third, as mentioned earlier, while the patent discloses the provision of a temperature sensor for a space, it does not appear to provide any provision which would allow room occupants to set room temperature. If occupant control were desired, it would be necessary to provide a potentiometer for each room. Such controls would give occupants rough control of the temperature setting but due to voltage loss in the wires, potentiometer inaccuracy, mechanical movement of the potentiometer mounting, inaccuracies in temperature measurement, it is unlikely that the setting would be very representative of the actual temperature setting in the room.

Fourth, the cost of wiring and installation would undoubtedly become a major factor in the cost and practicality of the system. For example, for a space comprised of seven rooms, 56 wires would have to be connected to the system controller from the rooms on the floor. Some of these wires would be very long. Also, retrofits of existing hotels would be very difficult due to the volume of wiring.

Fifth, and perhaps most importantly, the Johnson patent does not provide a system which performs energy management functions on the basis of the occupancy status of a room. As already mentioned, it would be economically impractical to put a Johnson system control in each room or suite. As a result, the Johnson system cannot allow the temperature of a vacant room or suite to rise or fall to ambient temperature if one of the other rooms or suites controlled by the controller is occupied.

There is, therefore, a need for an energy management system for multiple room buildings which is relatively inexpensive to manufacture, install and maintain, which provides optimum control of energy consumption in individual rooms or suites and which is capable of relatively inexpensively retrofitting of existing buildings. Economical installation means low cost in term of labour and materials and economical maintenance means quickly and easily upgrading all system components from a central location by relatively inexperienced personnel.

SUMMARY OF THE INVENTION

The present invention provides an energy management system for hotels, motels and other similar multiple room buildings in which the heating and cooling devices in each room or suite are controlled by a small microprocessor based electronic thermostat that is capable of receiving room occupancy information from a central computer, and which responds to this information by executing appropriate programmed algorithms. The thermostats limit energy usage by allowing the room to approach ambient temperature when the room is not occupied, but will allow the room temperature to be easily controlled by occupants when it is occupied. The thermostats include controls to allow the desired temperature of rooms or suites to be set by occupants and, thus, problems due to hardware failures are limited to a single room or suite.

While in the case of very small buildings it may be possible to directly connect a central computer to the thermostats through a communication medium, communication concentration devices will be required in the majority of cases. These devices allow a larger number of thermostats to be connected to the computer than would otherwise be permitted by the physical limitations of the communication medium. If required, the communication concentrators may be connected in a hierarchical manner that allows a virtually unlimited number of microprocessor based thermostats to be connected to the system.

In the preferred embodiment, a software program running on the central computer is linked into the front desk accounting system of a hotel or motel so that as people check into or check out of the hotel, the appropriate thermostats will receive an update of the occupancy status of the room or suite that they control. In addition to the primary energy management function associated with the room occupancy, there are a number of other functions that can be easily handled by the energy management system described. These functions include control of additional peripheral devices such as fans and blowers, periodic cycling of air conditioners to prevent ice build-ups that result in reduced efficiency, load shedding during peak periods, and additional energy management functions.

Devices such as fans and blowers help to circulate heated or cooled air within an area. The energy management system should be capable of controlling these devices in conjunction with heating and cooling appliances. Air conditioners often operate at reduced efficiency due to ice build-ups which inhibit their heat transfer capability. The capability of periodically cycling air conditioners to prevent reductions in efficiency due to ice build-ups would be a desirable capability of the energy management system.

Because energy costs may be higher than usual during peak load periods, a load shedding function that limits the overall energy usage can be easily incorporated into the system. Load shedding is typically accomplished by disabling energy using devices, such as heating and cooling equipment, for short periods of time in a manner that ensures that the available energy is shared among the devices that require the energy.

In addition to the occupancy status, other optional parameters could be transmitted to the electronic thermostat, and used by the thermostat's algorithm to control additional energy management functions: the system can provide the capability of limiting the temperature settings to reasonable minimum and maximum values to prevent energy wastage due to unreasonably high or low thermostat settings by occupants, and the system can allow the cooling or heating cycles to be disabled for periods of time when they are not required.

The energy management system could also include the capability of general building management, providing additional facilities such as: monitoring theft circuits in each room to ensure that appliances such as televisions are not removed, allowing building personnel to signal the computer from a room thermostat (a function that could be used by housekeeping personnel to indicate that a room has been cleaned and is ready for occupancy), and controlling PAY TV signal distribution in accordance with messages transmitted from the central computer.

The primary function of the computer is to provide a system operator interface and a link into the occupancy status information. The control of the various energy management functions are, in general, provided at the lowest possible level in the network hierarchy. The majority of control functions are performed at the thermostat level in accordance with the occupancy status, other information parameters that are transmitted to the thermostats and subsequently stored in memory on these devices. Control functions such as load shedding that cannot be performed at this level are handled by the communication concentrators.

A wiring system that allows a small set of wires to provide a common communication link and power supply source for a number of electronic thermostats would be a practical necessity for such a system since the cost of providing wiring and power supplies for individual thermostats would be prohibitively expensive and impractical to install. To reduce repair costs, it would be preferable for the thermostat to be designed in a manner that makes it possible to replace the thermostat electronics with minimal effort.

From a cost reduction perspective, it would also be desirable to limit the voltage and current distributed through the common power wiring in a manner that would allow less expensive wire to be used without presenting a fire hazard. Such wiring (which is referred to as Class 2 wiring within the Canadian Electrical Code) would allow the majority of the system to be installed by technicians rather than electricians.

BRIEF DESCRIPTION OF THE DRAWINGS

These and other features of the invention will become more apparent from the following description in which reference is made to the appended drawings wherein:

FIGS. 5 and 6 are similar to FIG. 2 but more specifically illustrate parameter and program reload operations;

FIGS. 13c to 13f illustrate the various user screens and menus;

DESCRIPTION OF PREFERRED EMBODIMENT

Figure 1:
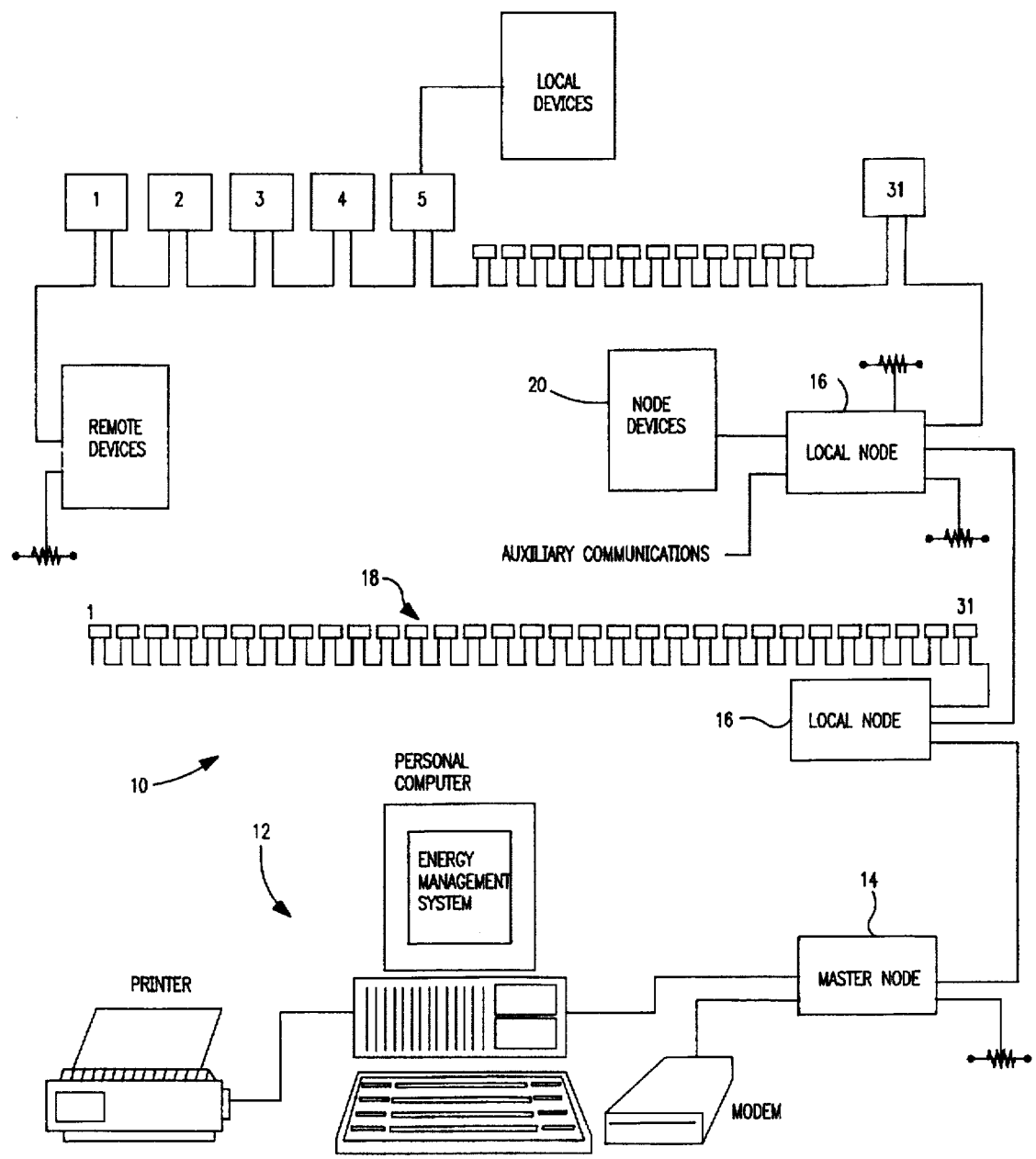
FIG. 1 is a block diagram representation of an energy management system (EMS) in accordance with a preferred embodiment of the present invention.
Figure 2:
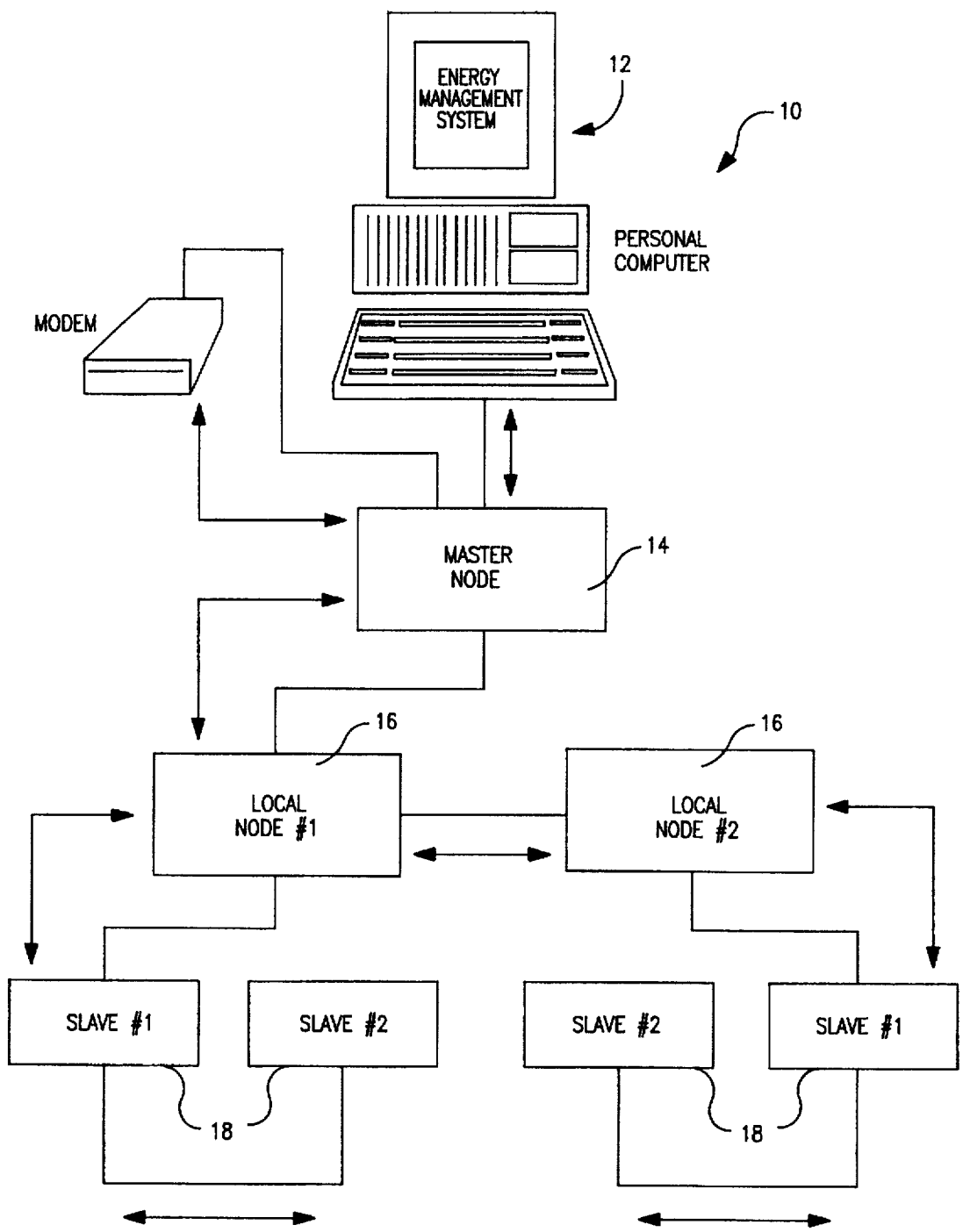
FIG. 2 is a system overview diagram illustrating the communication process of the preferred embodiment of the present invention and, particularly, showing that communications may be via wires or via a modem.

With reference to FIGS. 1 and 2, the energy management system 10 according to the preferred embodiment the present invention will be seen to comprise a central computer 12, one or more master nodes 14 serially connected to one another and to the serial port of the computer, one or more local nodes 16 serially connected to one another, and a plurality of slave devices 18, hereinafter called thermostats, serially connected to one another and to an associated local node for hi-directional communication therewith as explained more fully later. Each local node may also be connected to node devices 20 and/or auxiliary communications devices 22.

Each of the thermostats, the master node(s) and the local node(s) are in the form of electrical circuit boards having a microprocessor and associated commercially available electronic components and operate under the control of their own programs as described more fully later. The circuits are designed to limit the voltage and current distributed through the common power wiring in a manner which allows less expensive wire to be used without presenting a fire hazard. Such wiring, which is referred to as Class 2 wiring within the Canadian Electrical Code, allows the majority of the system to be installed by technicians rather than electricians. Power for the thermostats is downloaded by the network so that they need not be connected to a source of power within the individual rooms. This results in significant cost savings in both hardware and labour as compared to existing systems.

The local and master nodes are identical in construction and programming. The only difference resides in the manner in which the circuit boards are initialized upon installation. This further simplifies the cost of the overall system.

The thermostats are responsible for controlling the environment within their respective rooms or suites and operate within the constraints of parameters downloaded to them from time to time. Both their operating program and the parameters may be updated. Further, the thermostats can communicate the current status of their respective rooms to the main computer system via the local nodes and master nodes.

Each of the local nodes is responsible for a plurality of thermostats in a particular area, such as a floor or part thereof or a building or part thereof. Similarly, each master node is responsible for a plurality of local nodes and communicates directly with the main computer system. It includes a master node table for storing updated status information of all parameters for each local node and its respective slaves.

Main Computer

The primary function of the computer is to provide a system operator interface and a link into the occupancy status information. It is important to note that the control of the various energy management functions is, in general, provided at the lowest possible level in the network hierarchy and not by the main computer. The majority of control functions are performed at the thermostat level in accordance with the occupancy status and other information parameters that are transmitted to the thermostats and subsequently stored in memory on these devices. Control functions such as load shedding that cannot be performed at the thermostat level are handled by the local nodes, sometimes referred to herein as communication concentrators.

Figure 3:
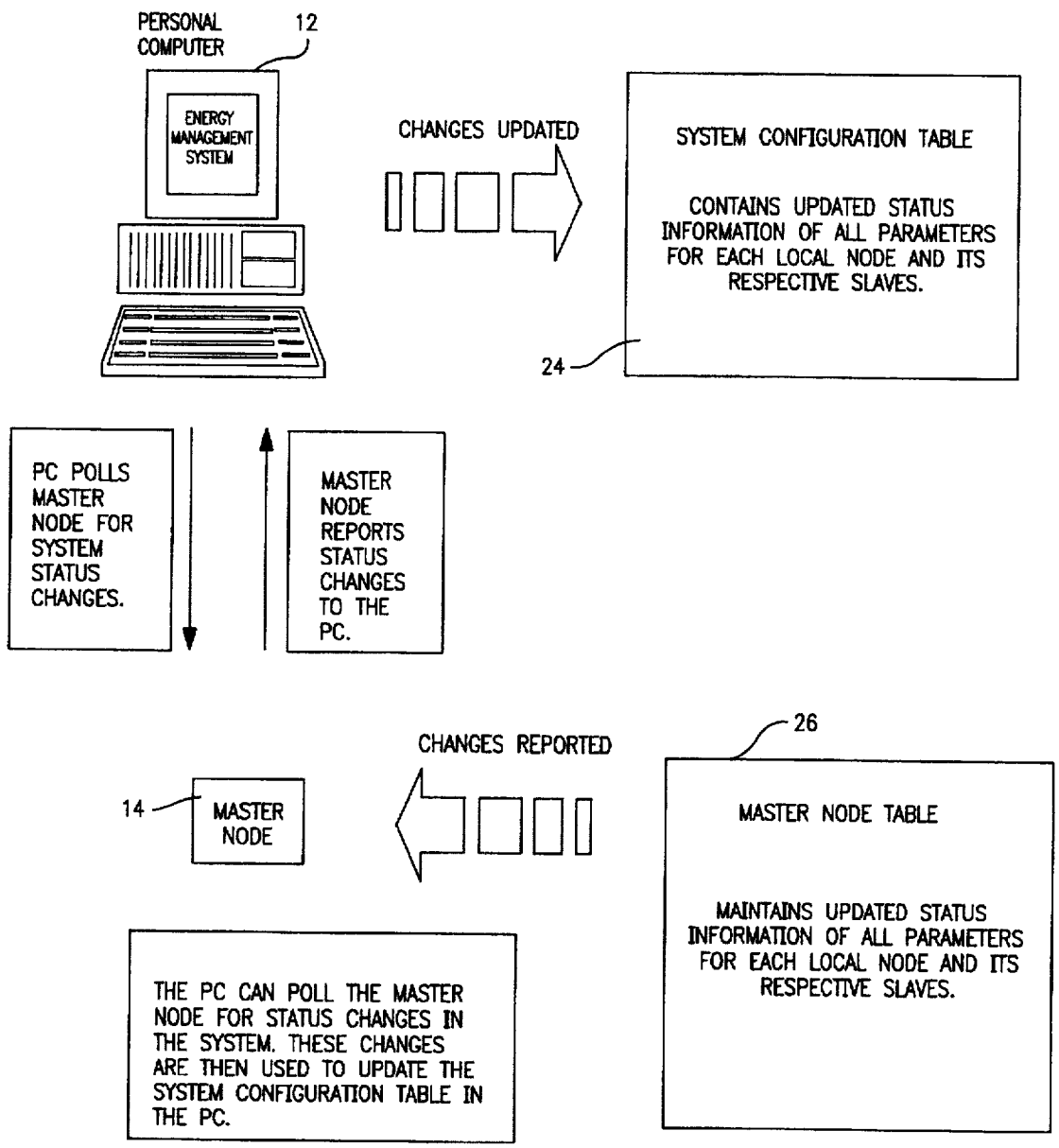
FIGS. 3 to 6 are block diagrams illustrating communications between the main computer and the master node and showing that the main computer is provided with a System Configuration Table for storing updated status information of all parameters for each local node and its respective slaves and, similarly, that the master node is provided with a master Node Table for storing updated status information of all parameters for each local node and its respective slaves.
Figure 4:
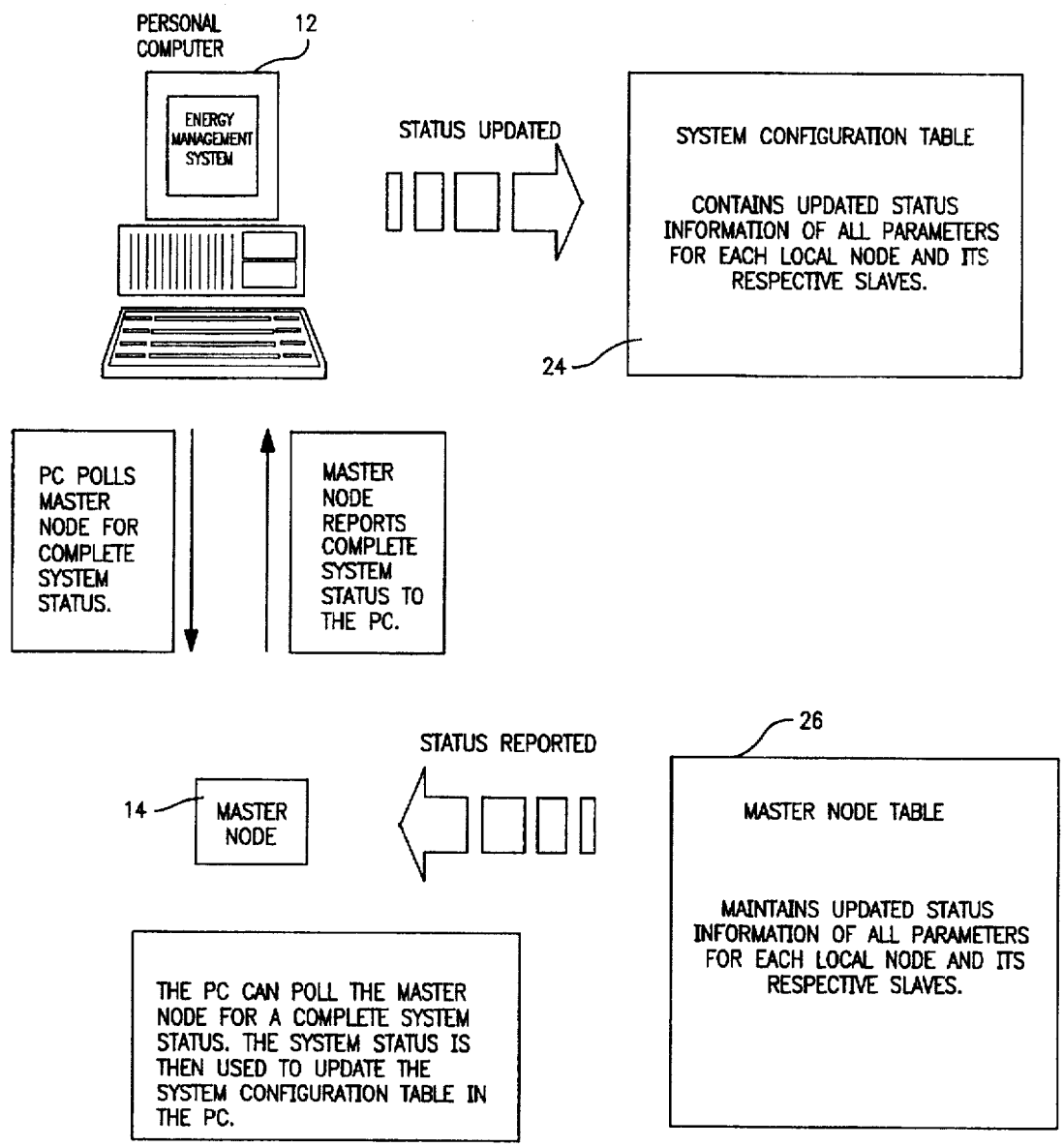

With reference to FIGS. 3 and 4, it will be seen that the main computer comprises a central processing unit (CPU) 30, a display monitor 32, a keyboard 34 and an optional printer 36. The CPU includes a mass storage device (not shown) for storing data and program files in a well known manner. The storage device includes a data file in the form of a System Configuration Table 38 for storing updated status information of all parameters for each local node and its respective slaves. Similarly, the master node, which is described in more detail later, includes a Master Node Table 40 for storing updated status information of all parameters for each local node and its respective slaves. From time to time, the computer polls the master node for either system status changes or for the complete system status. The master node responds by extracting the required information from its Master Node Table and reporting either only the changes or the complete status of all slaves under its control. The computer updates its System Configuration Table upon receipt of the master node communication.

Figure 5:
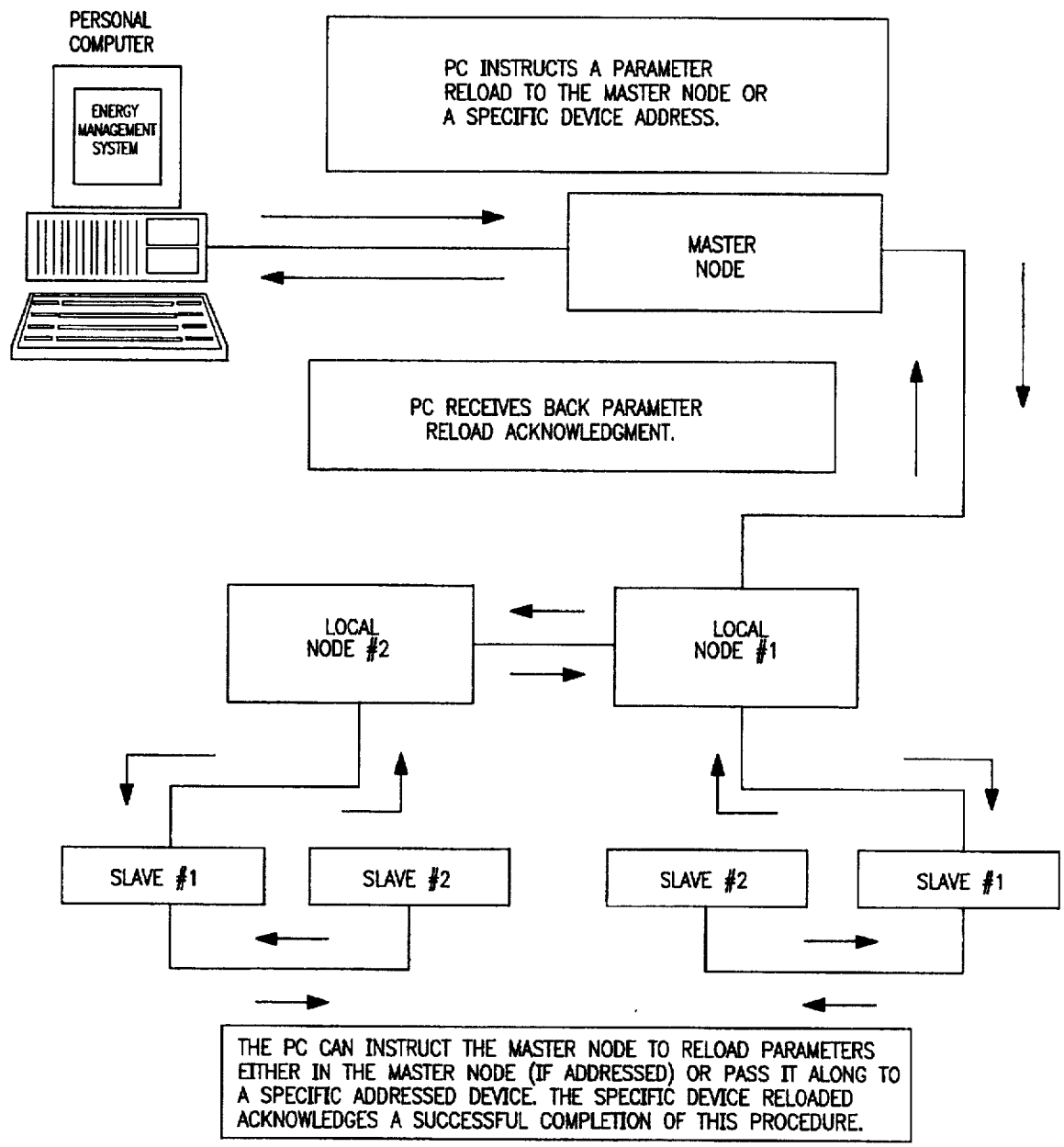
Figure 6:
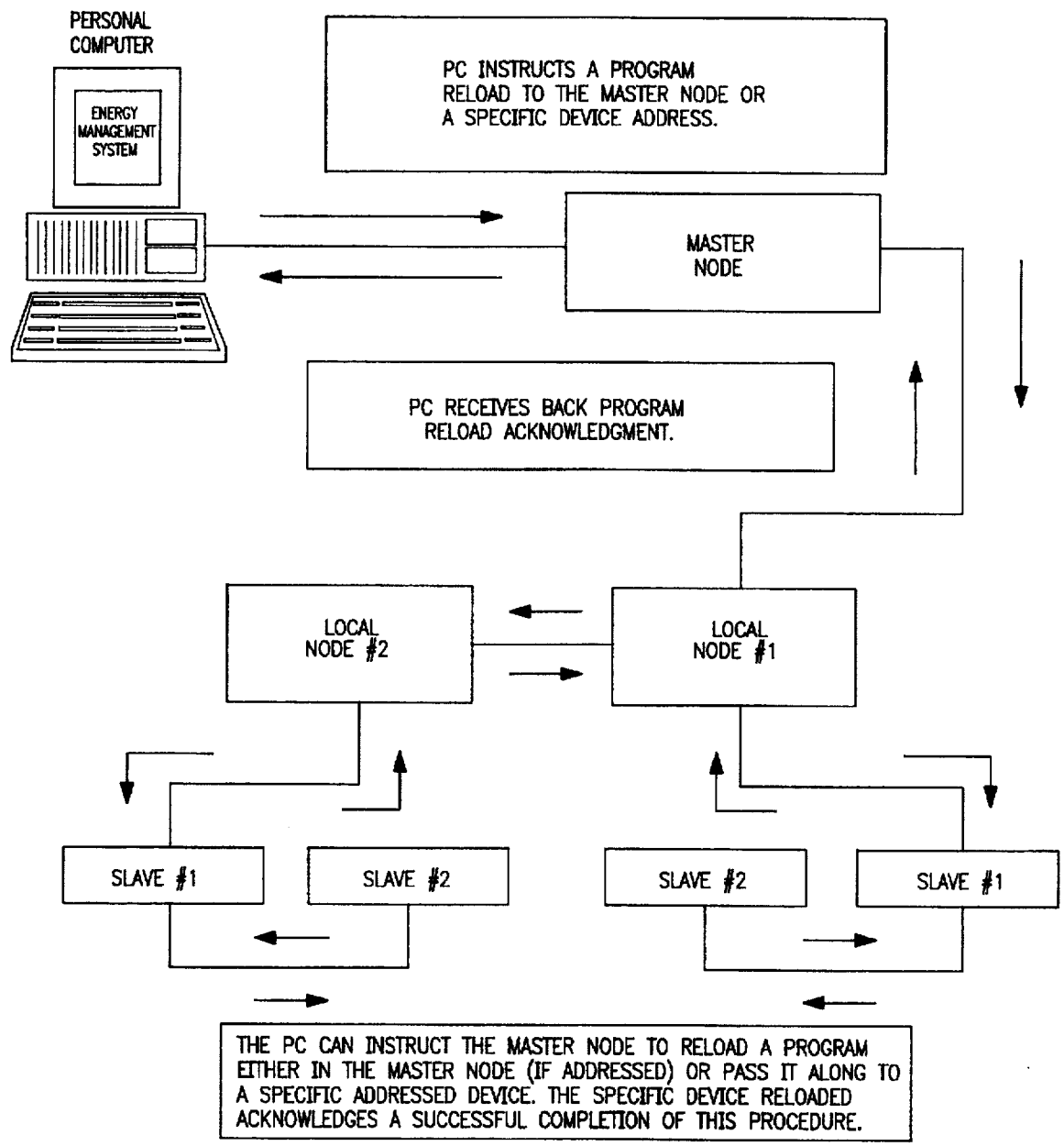

FIGS. 5 and 6 illustrate two important functions of the computer: requesting a parameter reload and a program reload. As indicated by the solid black arrows, the computer can instruct the master node to reload parameters or a program either into the master node itself, if it is addressed, or to pass it along to a specifically addressed device which could be a local node or a thermostat. The addressed device which is reloaded acknowledges a successful completion of this procedure by transmitting an appropriate signal back through the network to the main computer as indicated by the grey arrows. These and other functions of the computer are illustrated in FIGS. 7 to 12.

Figure 7:
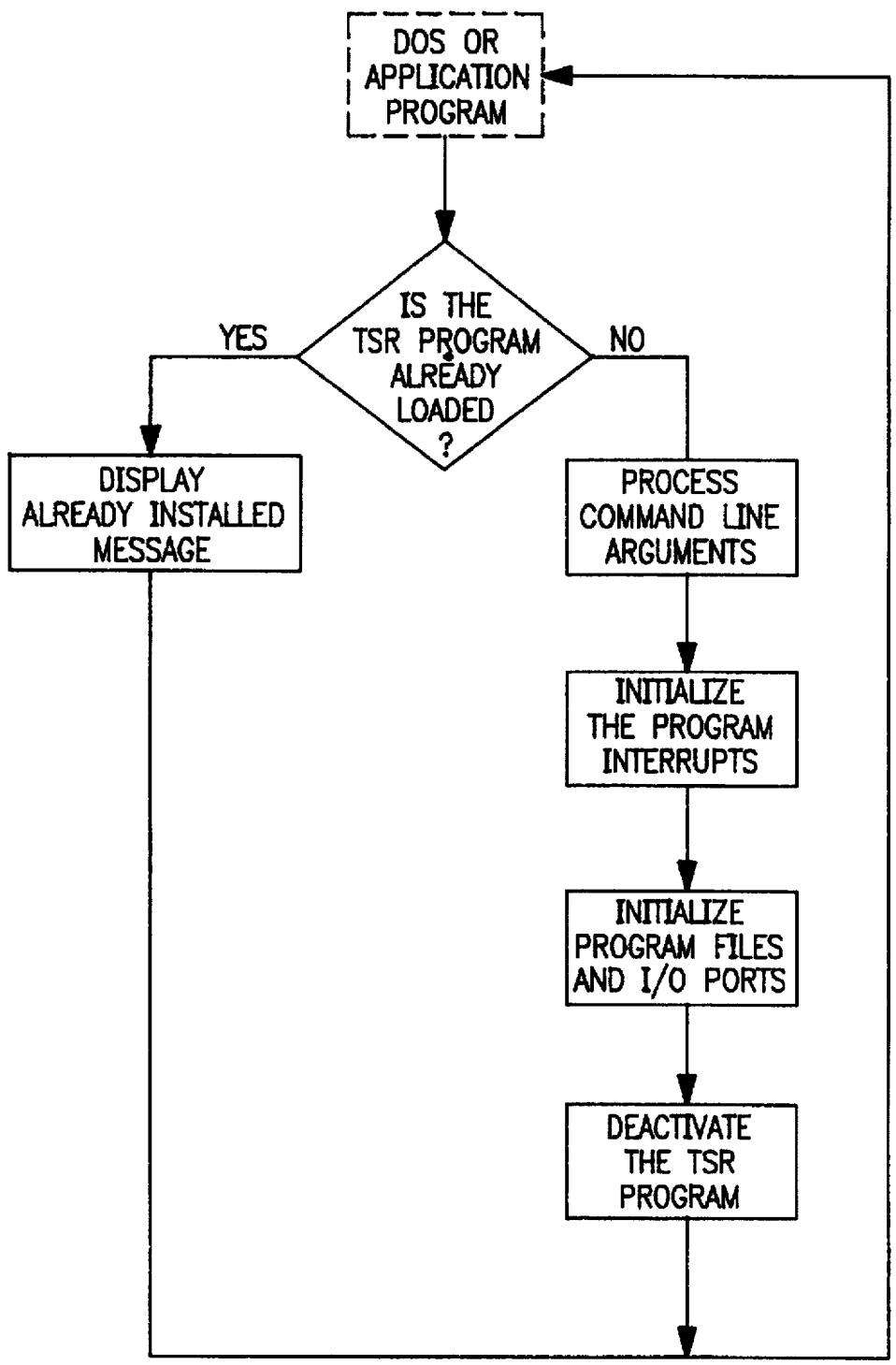
FIGS. 7 to 12 are flow charts illustrating the operation of the Terminate-and-Stay-Resident (TSR) program which controls the main computer.

The energy management system of the preferred embodiment of the present invention operates under the control of a TSR (Terminate-and-Stay-Resident) program. The TSR program can be loaded into memory by the user entering a command via the keyboard or by another program. Once loaded into the computer memory, the TSR can be invoked by pressing a "hot key" on the computer keyboard. FIG. 7 illustrates this operation. This mode of operation frees the computer for use in other applications programs such as a hotel or motel management program, an accounting program or the like.

Figure 8:
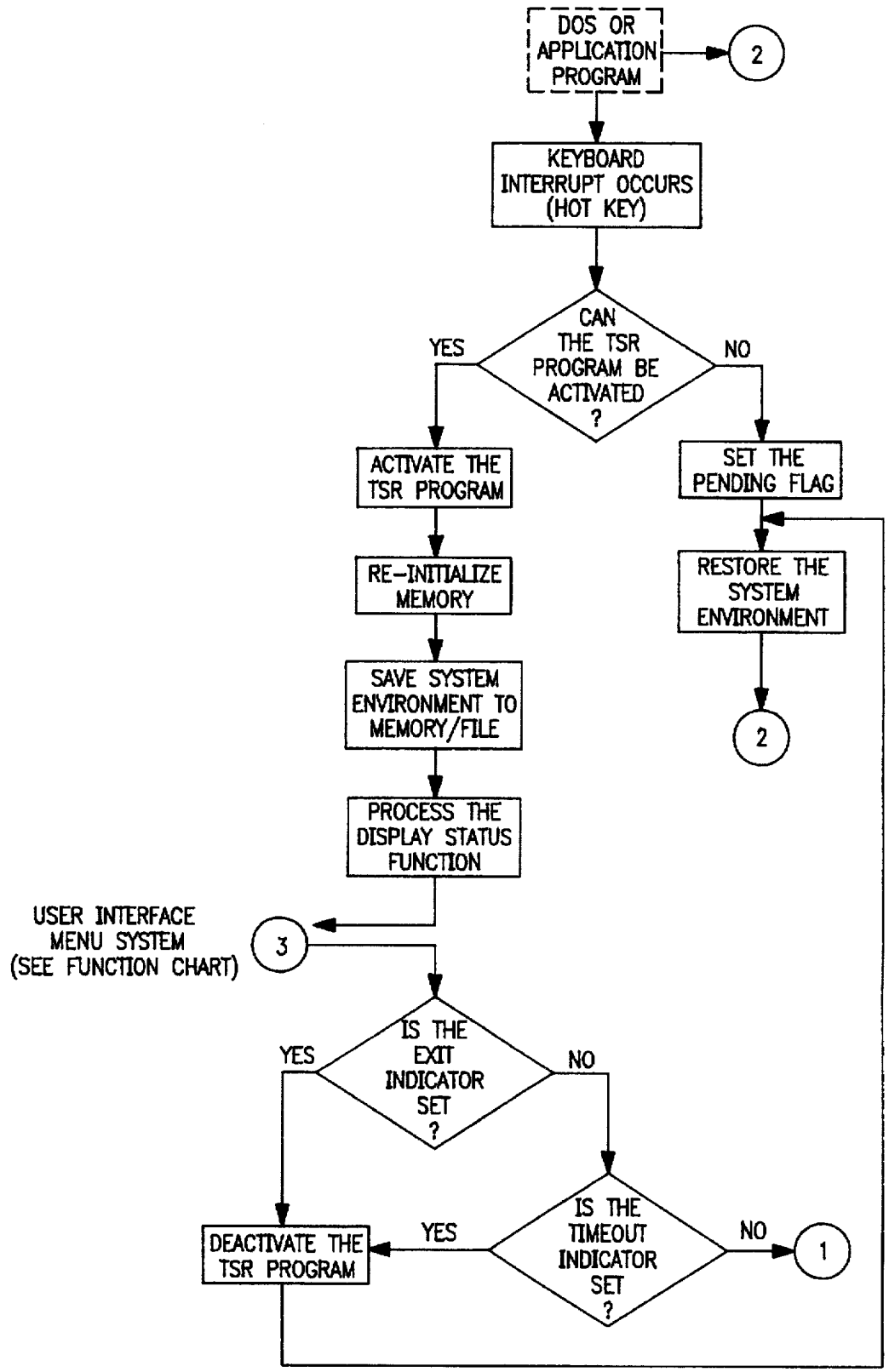

FIG. 8 illustrates the response of the program when the hot key is pressed by the user. The TSR can also be accessed from the disk operating system (DOS) command line or from an application program. The program first determines whether the program can be activated. If not, it sets a pending flag, restores the system environment and returns to DOS or the application program which was loaded when the hot key was pressed. If it can be activated, it re-initializes memory, saves the system environment in memory or a file, processes a display status function (FIGS. 10, 11 and 12) and loads a user interface menu system.

Figure 9:
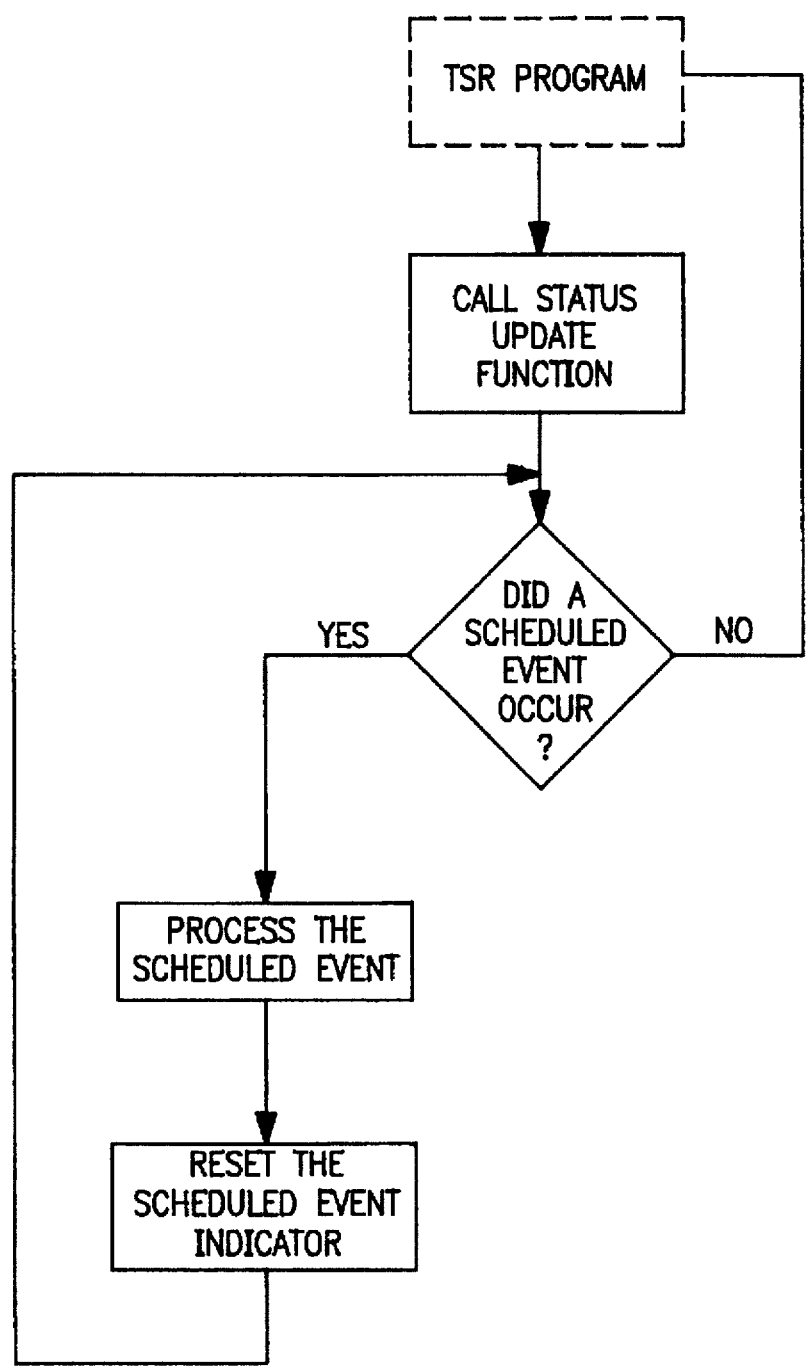

FIG. 9 illustrates the response of the program to a call for status update. The program ash whether a scheduled event occurred and where one has not, the function returns to the main TSR program. If a scheduled event did occur, the event would be processed and the event indicator would be reset. The program then returns to the scheduled event occurrence prompt.

Upon returning from the user interface menu system, the program checks whether an exit indicator has been set and, if so, deactivates the TSR program, restores the system environment and returns to DOS or the application program. If the exit indicator was not set, the program checks whether a timeout indicator has been set and, if so, deactivates the TSR program, restores the system environment and returns to DOS or the application program. If the timeout indicator was not set, the program displays the main menu/status change screen and updates the screen whenever a keyboard interrupt occurs.

Figure 10:
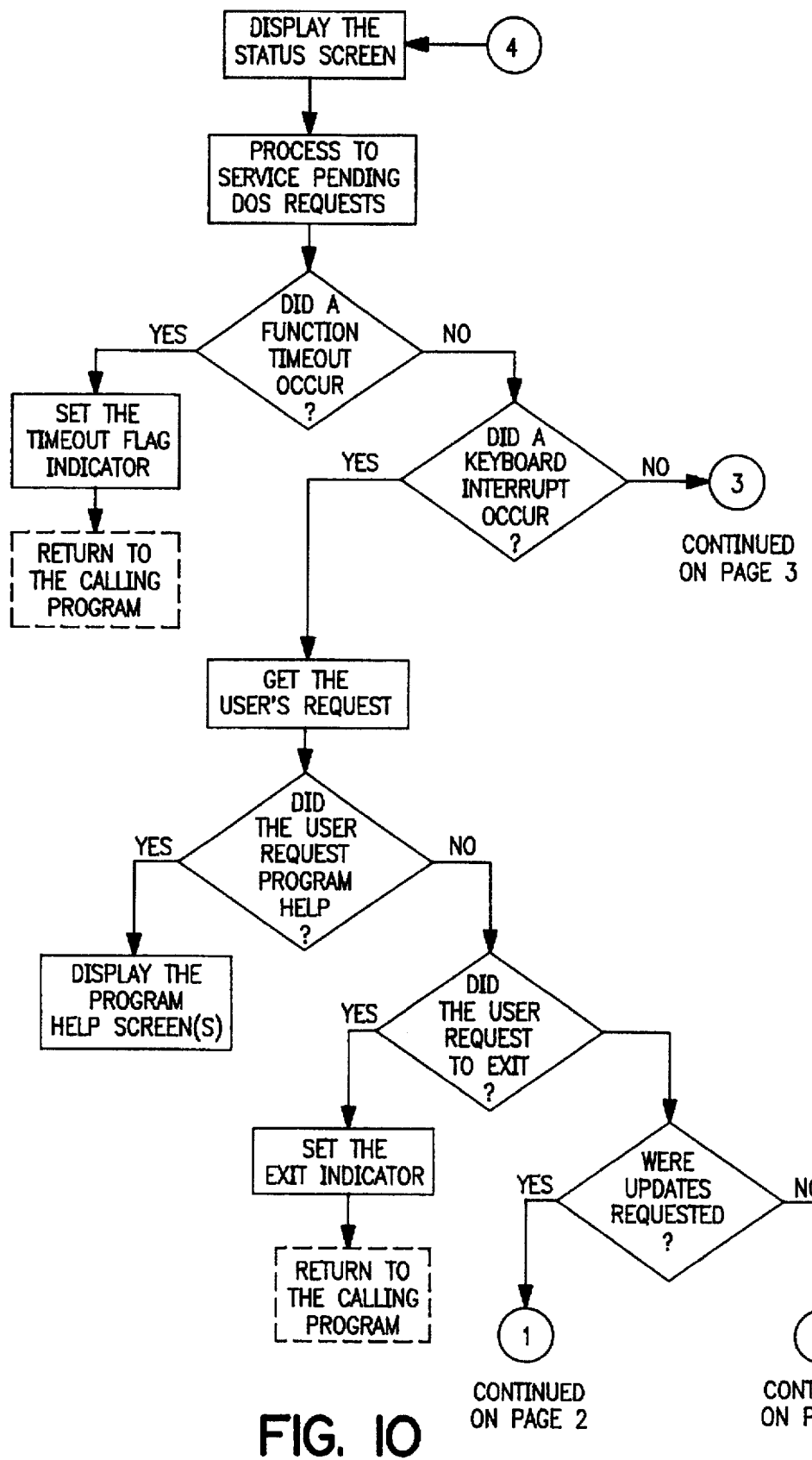
Figure 11A:
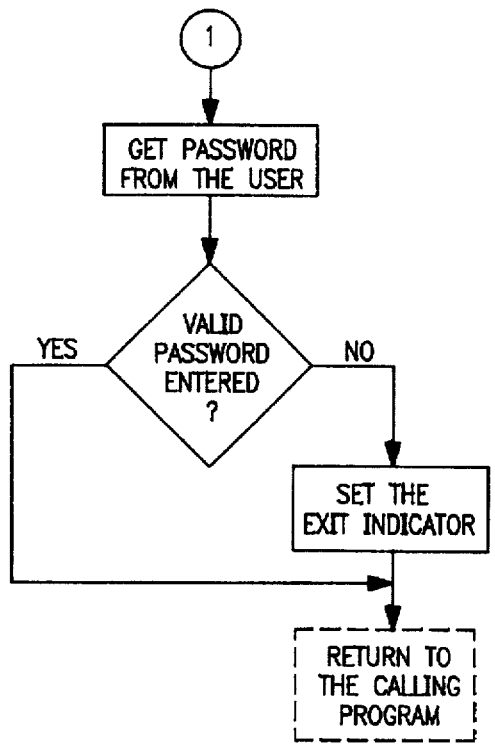
Figure 11B:
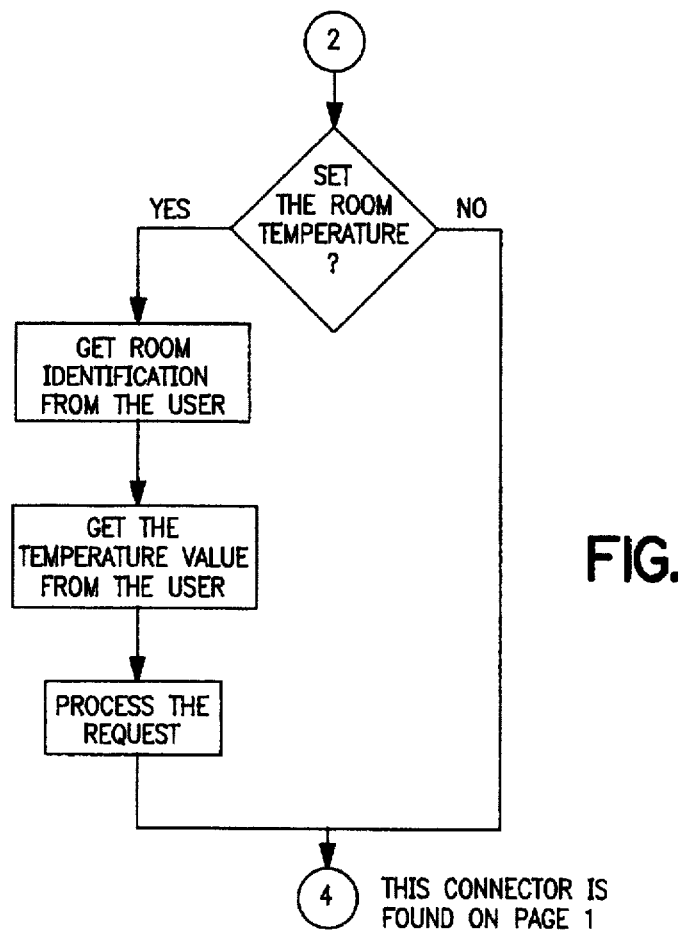
Figure 12:
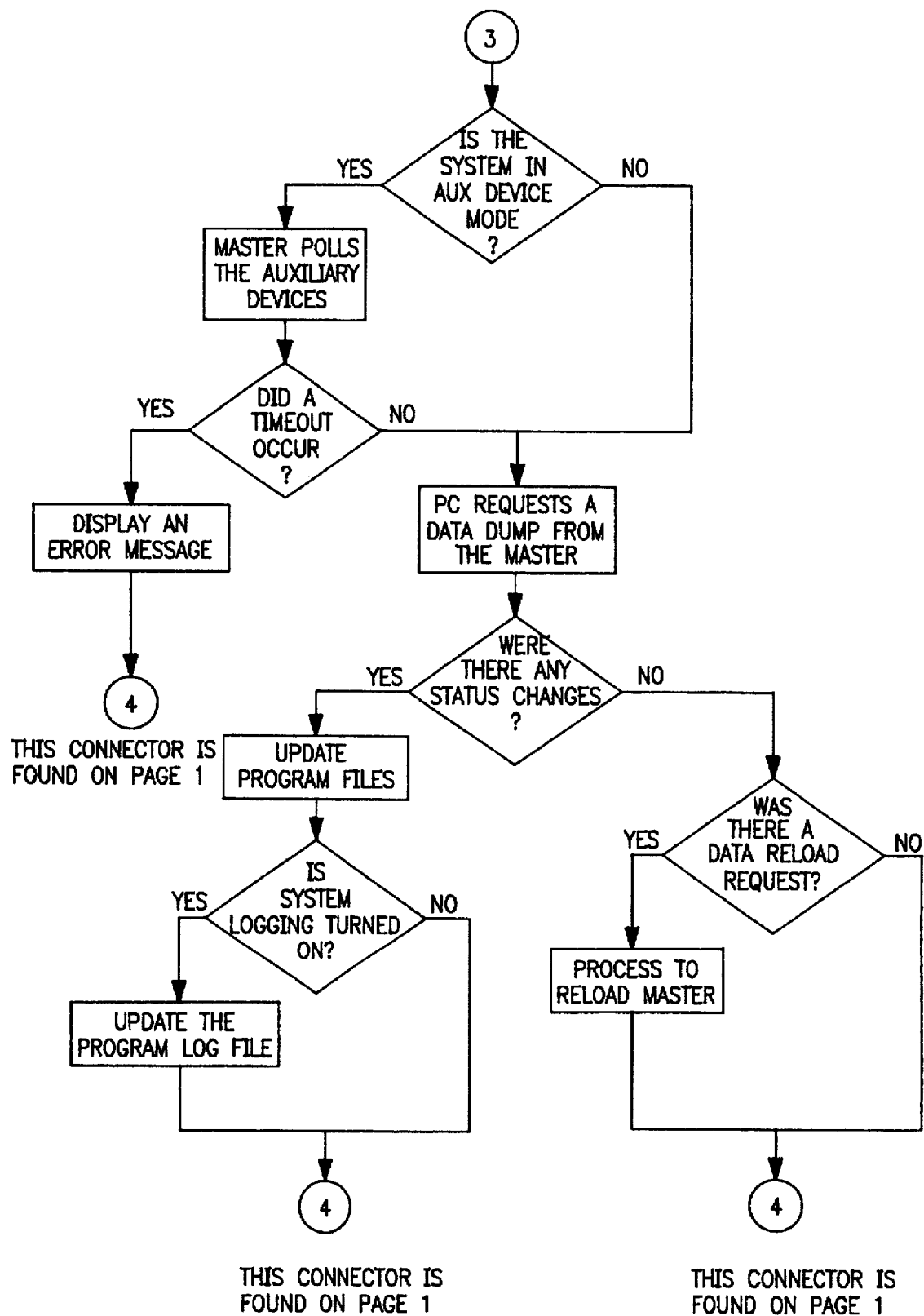

FIGS. 10, 11 and 12 are flow charts of program operation while the display status screen function is operational. The TSR program continuously checks for function timeouts and keyboard interrupts and, in the absence of these, requests a data dump from the master node from which it determines whether either there have been changes in the status of the local nodes and/or their respective slave thermostats or there have been data reload requests from the master node, local nodes or the thermostats. More specifically, as can be seen from the drawings, the program cycles as follows. It initially determines whether a function timeout has occurred and, if so, sets a timeout flag indicator and returns to the calling program. Otherwise, the program checks whether a keyboard interrupt has occurred. If there has not been a keyboard interrupt, the program determines whether the system was set to run in an auxiliary device mode (see FIG. 12). If so, the master node is caused to monitor auxiliary devices. If the auxiliary devices do not respond, a timeout occurs, which condition causes the program to display an error message on the display screen. If there was no timeout condition or if the system is not in auxiliary device mode, the program requests a data dump from the master node and checks whether there were any status changes. If there were, the System Configuration Table is updated and, if a logging function was turned on, a program log file is updated. If there were no changes in the status of the thermostats, the program determines whether the master node requested a data reload and, if so, invokes a routine, discussed later, to reload the master node and then returns to the display screen and repeats the process.

When a keyboard interrupt occurs, the program first determines whether the user requested program help. If so, it displays program help screens. If not, it determines if the user wishes to exit the status display screen by checking the status of an exit indicator. If set, the system returns to the calling program. Otherwise, the program determines whether the interrupt indicates whether updates were requested. If so, the program solicits the user's password, checks the validity of the password and returns to the calling program; otherwise, it sets the exit flag and returns. If updates were not requested, the program determines whether the room temperature is to be set and, if so, requests the room identification and temperature value from the user, processes the request and returns to the display screen.

Screens and Menus

Figures 1, 13A:
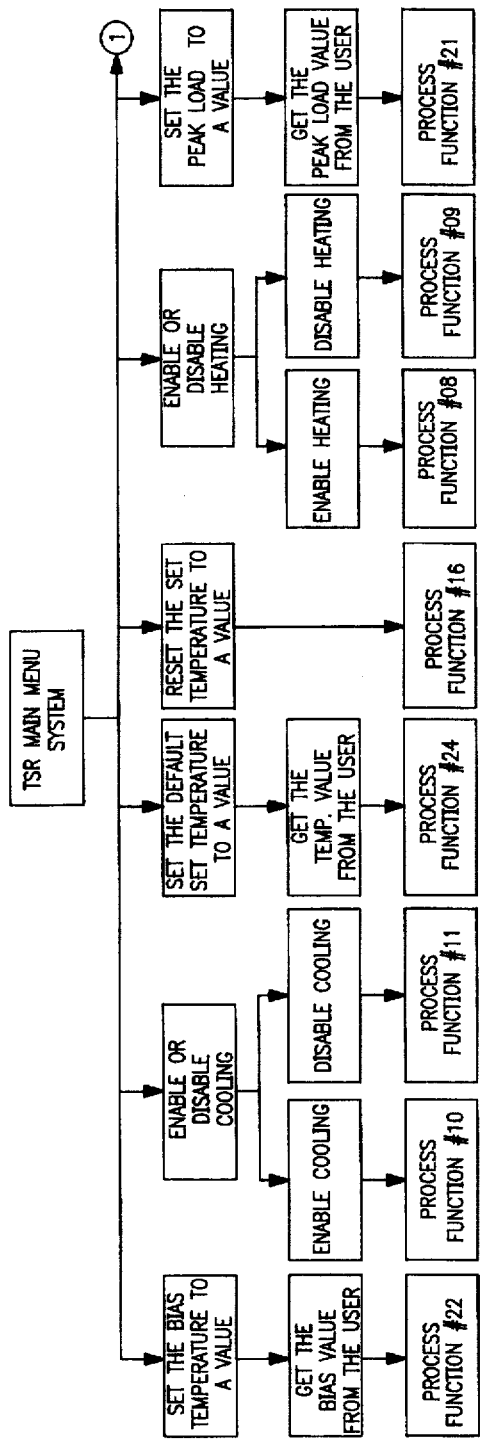
FIGS. 13a and 13b illustrate the TSR main menu which allows the user to set system operating parameters.
Figures 2, 13A:
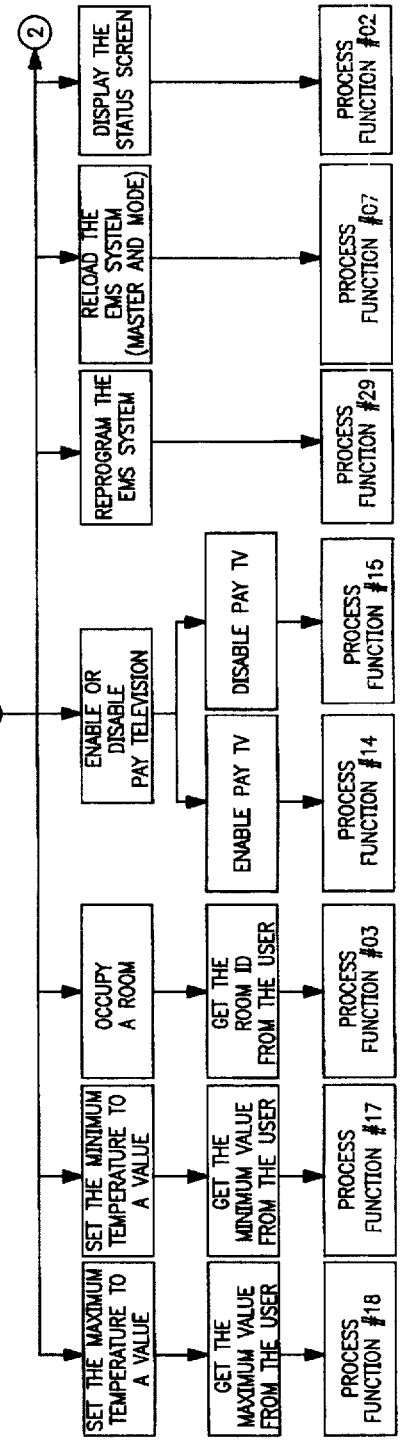
Figures 1, 13B:
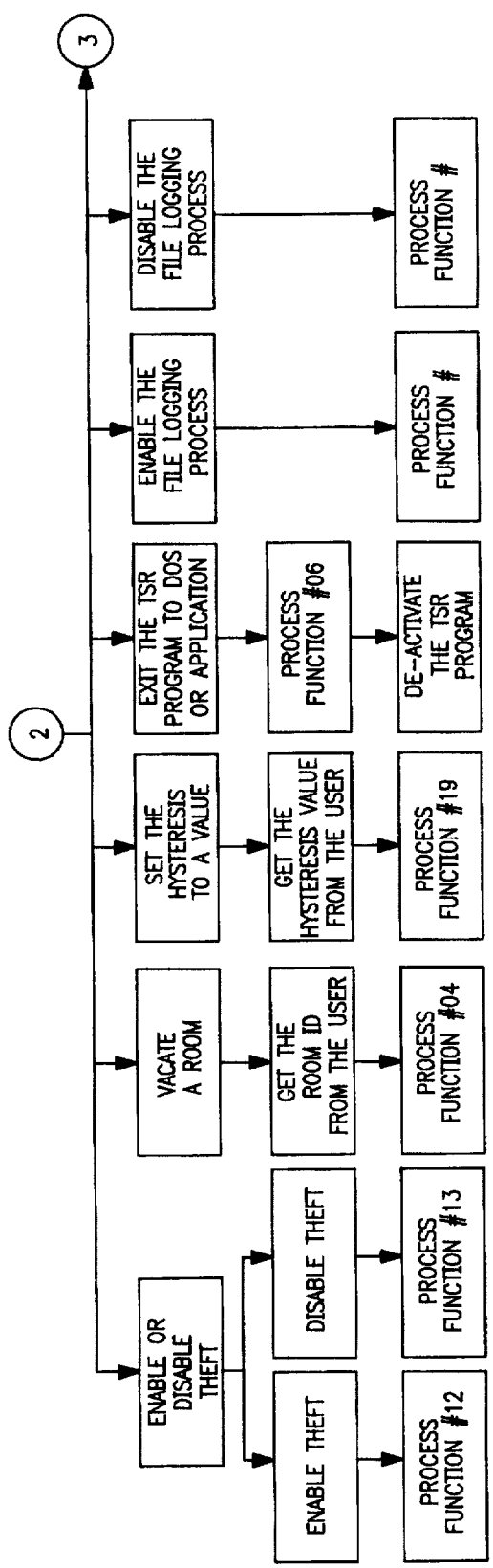
Figures 2, 13B:
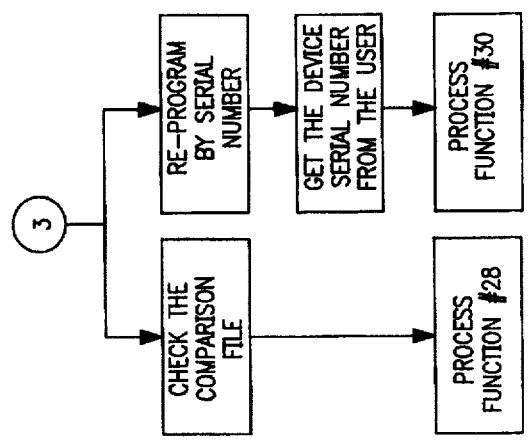

FIGS. 13a and 13b illustrate the TSR main menu which allows the system supervisor to set system operating parameters. As can be seen, the system allows the supervisor to specify the bias temperature to a particular value, enable or disable cooling or heating, set or reset the value of the default set temperature, set the peak load to a value, set the maximum and/or minimum room temperatures, occupy or vacate a room, enable or disable pay television, reprogram the system, reload the system into the master and local nodes, enable or disable theft protection, set hysteresis, enable or disable file logging, check a comparison file, program specific devices by identification number and exit the program.

FIG. 13c illustrates an energy management system control screen. This screen provides user selectable options for controlling the energy management system. The available functions are described as follows. The Set Bias Temperature allows the temperature reading displayed on the thermostats to be biased a number of degrees higher or lower than the actual room temperature. It can also be used to compensate for a batch of temperature sensing thermistors that are giving incorrect readings or can be used by a hotel operator to save energy by raising or lowering room temperatures by a few degrees during the night without altering the actual setpoint of the thermostats.

Enable/Disable Cool allows the cooling cycle of air conditioners to be enabled or disabled on an individual room or global basis.

Set Default Temperature allows the initial occupancy temperature setting in all rooms to be defined.

Reset Set Temperatures can be used to reset all thermostats to the default temperature setting previously specified.

Enable/Disable Heat allows the heating cycle of heating appliances such as baseboard heaters to be enabled or disabled on an individual room or global basis.

Peak Load Management allows the percentage of maximum electrical load that is allowed at any given time to be specified. It is also useful for ensuring that the total energy usage of the hotel/motel does not exceed a specified amount.

Set Maximum Temperature allows the maximum occupant setable temperature to be defined. It thereby prevents excessive use of room heaters.

Set Minimum Temperature allows the minimum occupant setable temperature to be defined. This feature prevents excessive use of room air conditioners.

Check-in Room allows the status of a specific room to be specified as occupied.

Enable/Disable Pay-TV allows the pay-TV decoder in individual rooms to be enabled or disabled.

The Reprogram System feature is used to completely re-initialize the energy management system. It provides a complete software restart including downloading of any required node or thermostat software.

Reset is used to force re-initialize all system communications.

Status is used to display the system status screen. Enable/Disable Theft allows the theft monitoring alarm for a specific room to be enabled or disabled. Check-out Room allows the status of a specific room to be specified as unoccupied.

Set Hysteresis is used to prevent appliance control relays from continually turning off and on when the room temperature is hovering around the setpoint temperature. It ensures that appliances will only change state after there has been a sufficient change in temperature.

FIG. 13d represents the preferred embodiment of the energy management system monitor screen which shows a sample number of room entries reflecting the current status of the thermostat in each room. FIG. 13e provides a legend for FIG. 13d. Proceeding from left to right on FIG. 13e, the first parameter is a room ID and occupancy status indicator. This indicator displays the number of the room being monitored. The colour of the room number indicates whether the room is currently occupied or not. In the present embodiment the room alphanumeric on a blue background indicates that the room is occupied while the room alphanumeric on a white background indicates it is unoccupied.

The next display is the theft alarm indicator which reflects the alarm monitoring status for television theft circuits. If the display is blank there is no alarm condition. A yellow asterisk appears if the theft feature has been disabled, such as for changing a television. A red asterisk with a siren indicates that a theft has been detected. The room number is also displayed onscreen along with other application screens.

The third display is the Pay-TV indicator which presents a ☉ to reflect that the Pay-TV option is active. When it is inactive the display is blank.

The next indicator is the main room ambient temperature which provides a two digit temperature display of the actual measured room temperature.

Following the main room ambient temperature indicator is the set temperature indicator which provides a two digit display of the user or front desk set target temperature of the thermostat in the room.

The sixth display is the main room appliance status indicator which reflects the current operational state of the room appliance control system. Where the indicator is red with a white upward pointing arrow, heating is taking place in the room. When heating should be taking place, but is not as a result of disablement due to peak management, a black colour with a white arrow pointing upwards is displayed. During cooling the indicator is blue with a white arrow pointing downwards. When there would be cooling, but is not as a result of disablement due to peak management, the display indicator is black with a white arrow pointing downward. A display on this indicator of a green colour with black (off) or white (on) downward pointing arrow, reflects the fact that the room is cooling with the de-icing cycle operative.

The next onscreen indicator reflects "other room" ambient temperatures. In some installations it will be desirable to provide independent control of a second room within a hotel suite such as a washroom. The monitored temperature of the second room is displayed at this indicator. When the option is not used a blank appears whereas during use, a two digit temperature display of actual room temperature is present. It may also be desirable in some installations to provide independent control of a second room's appliance. The status of this appliance is illustrated in the next indicator. The operational state of the other room appliance control system is displayed at this indicator in a fashion which is identical to the main room appliance status indicator already described.

The next indicator reflects whether the heating or cooling cycles for a room have been disabled. A negative sign is a cool disable while a positive sign is a heat disable. A plus/minus sign together indicates that both are disabled.

The final indicator onscreen for each room is the housekeeping status. Each room thermostat has a facility to allow the cleaning staff to signal the main computer that a room has been cleaned. This status is indicated as a numeric value. 0 is a room to be cleaned, 1 indicates that a maid is in the room, 2 indicates that the maid is leaving the room and 3 means that the room has been checked and is ready to accept a new occupant.

All of these parameters are stored in the System Configuration Table and, as mentioned earlier, are downloaded to the master node, local nodes and thermostats from time to time.

FIG. 13f illustrates a hotel management software screen. This screen provides the user with selectable options for hotel management and accounting functions. The options that are relevant to the energy management function are listed as follows. The Check-in feature allows all required information concerning a customer who has checked into a room to be entered into the computer. This information is automatically passed on to the energy management software, which notifies the appropriate thermostat that the room state has changed to occupied.

Check-out closes out the record for a customer who has checked out of a room. This information is automatically passed on to the energy management software, which notifies the appropriate thermostat that the room state has changed to unoccupied.

Energy Management System Updates allows the computer operator to change operational parameters of the system by invoking the energy management system control screen.

Exit exits from TSR and returns control to the application previously active on the computer.

Set Room Temperature is used to set the desired room temperature in a specific room.

Start Logging is used to start logging all energy management status information changes to disk. It is also useful for obtaining raw data for reports or operational analysis.

Stop Logging is used to stop the logging of all energy management status information changes to disk.

Temperature Compare will compare the actual room temperatures with the desired room temperatures and is also useful as a diagnostic tool for finding system faults.

Reprogram by Serial Number allows the user to reprogram a specific thermostat.

It will be seen from the foregoing that the central computer does not itself perform any energy management or monitoring functions. Rather, it merely interfaces with the system supervisor in order to receive new values for parameters or to cause the programs and/or data to be reloaded into the various subsidiary devices and periodically polls the master node for status changes, program reloads or data reloads. These functions involve very little computing power and therefore allows the computer to be used to service other application programs in the foreground. In addition, it considerably simplifies the process of updating or servicing the subsidiary devices when data or program changes are required. This process is fully automated.

Master Node

Reference will now be made to FIGS. 14a, 14b, 14c and 15 which are flow charts illustrating the operation of the Master Node program. When the Master Node program is first loaded into memory, the program checks whether a program reload flag has been set. This flag is set automatically until the program is initialized during installation. If the flag is set, the program invokes a Loader Process subroutine illustrated in FIG. 15 to which reference will now be made.

The program loader subroutine first checks whether the program is loaded into memory. If it is not loaded, then it checks program interrupts, performs computer-master node handshaking operations and checks whether it is to run a program command. If not, it loads a buffer, checks whether data was received properly and if so loads an EEPROM. This process continues until it is to run a program command. If the program is loaded, the program determines whether it is to run in a master node mode or a slave node mode and then invokes the appropriate routine.

Figure 14A:
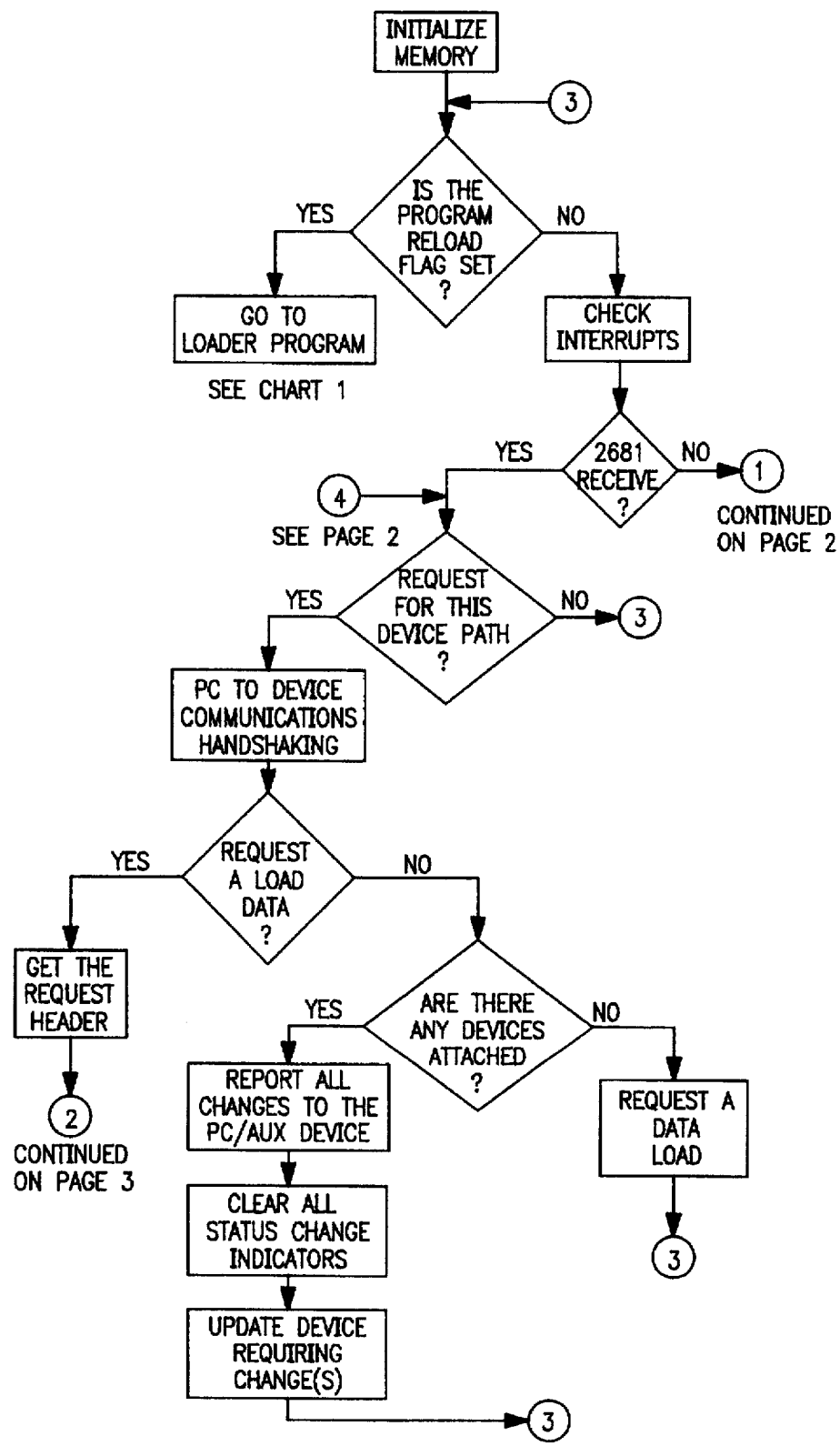
FIGS. 14a, 14b and 14c are flow charts illustrating the operation of the Master Node program.
Figure 14B:
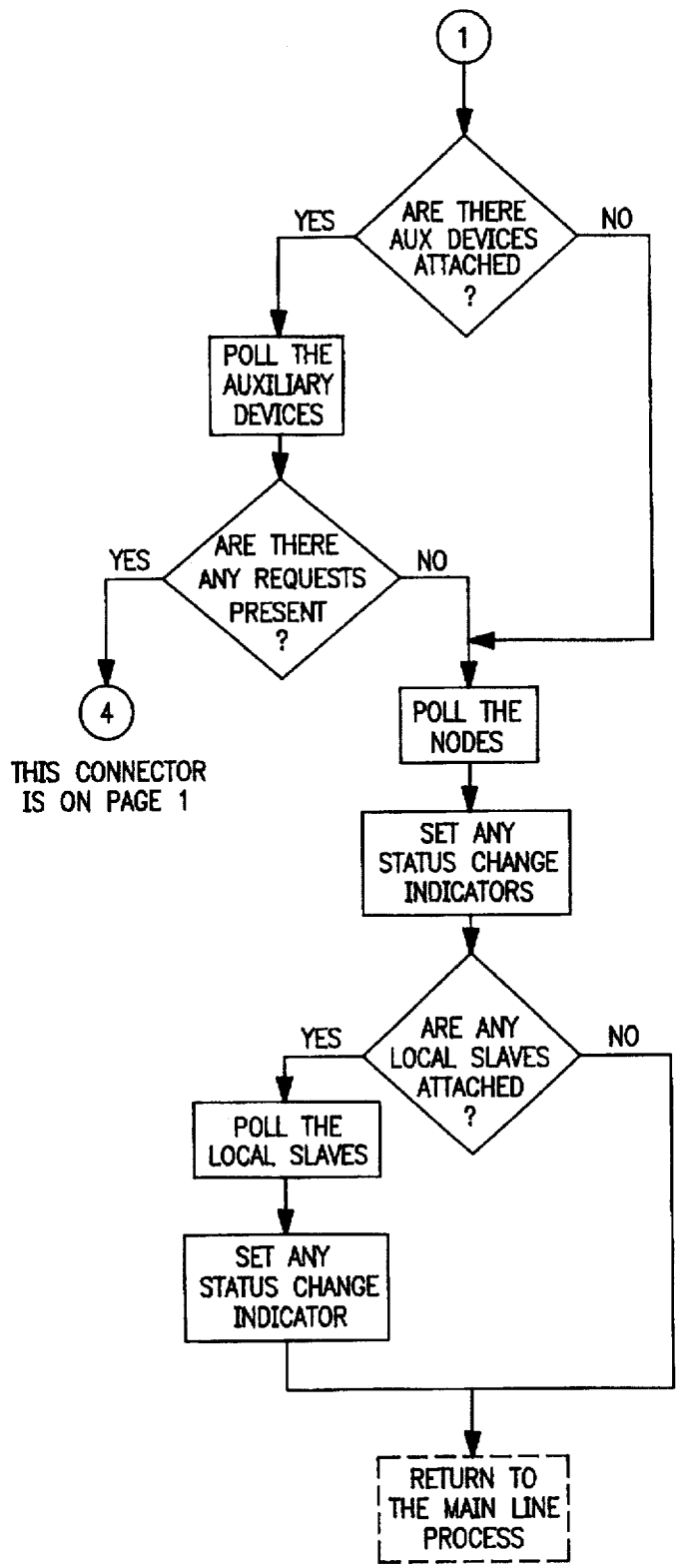

With reference to FIG. 14a, when the program reload flag is not set, the program checks for interrupts. If no interrupts have been received then, as shown in FIG. 14b, the program checks whether there are any auxiliary devices attached and, if so, it polls the devices and determines whether there are any requests present. If there are requests, it processes them in the manner described below with reference to FIG. 14a. If there are no requests, the program polls the local nodes connected to the master node, determines whether there are any changes in the status of parameters, and, if so, sets appropriate indicators or flags. It then checks whether there are any slave devices attached and, again, polls the slaves, determines whether there are any changes in the status of parameters, and, if so, sets appropriate indicators or flags. The program then returns to the main routine.

With reference to FIG. 14a, when the main routine detects an interrupt, it determines whether the interrupt applies to it. If it does not apply, it ignores it and continues to monitor the communications lines for a program reload flag and for interrupts. When the interrupt applies to it, the program performs the necessary communications handshaking with the main computer and then determines whether the interrupt involves a request for data load. If so, the program reads the request header and proceeds in the manner illustrated in FIG. 14c. As shown in FIG. 13c, if the request to load all devices, the meter node reloads its configuration table as well as those of all of local nodes connected to it. If the request applies only to a specific device, the program obtains the data required and reloads that device. The program then returns to the mainline program and continues to monitor its input line for interrupts.

Figure 14C:
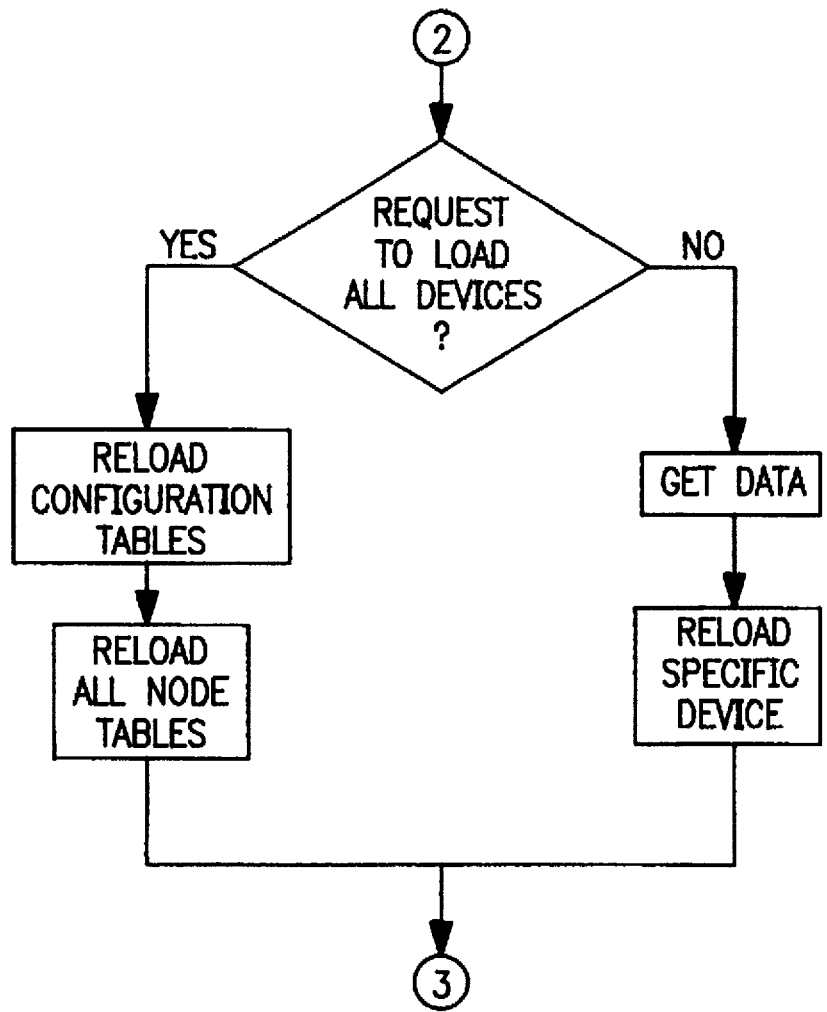

Returning to FIG. 14a, when the program determines that an interrupt does not involve a data download request, it checks whether there are any devices attached to it and if so reports all changes to the computer auxiliary device, clears the status change indicators and updates the devices requiring changes and then proceeds with the functions outlined above with respect to FIG. 14c. If no devices are attached, the program requests a data load and proceeds as outlined in FIG. 14c.

Local Nodes

Figure 15:
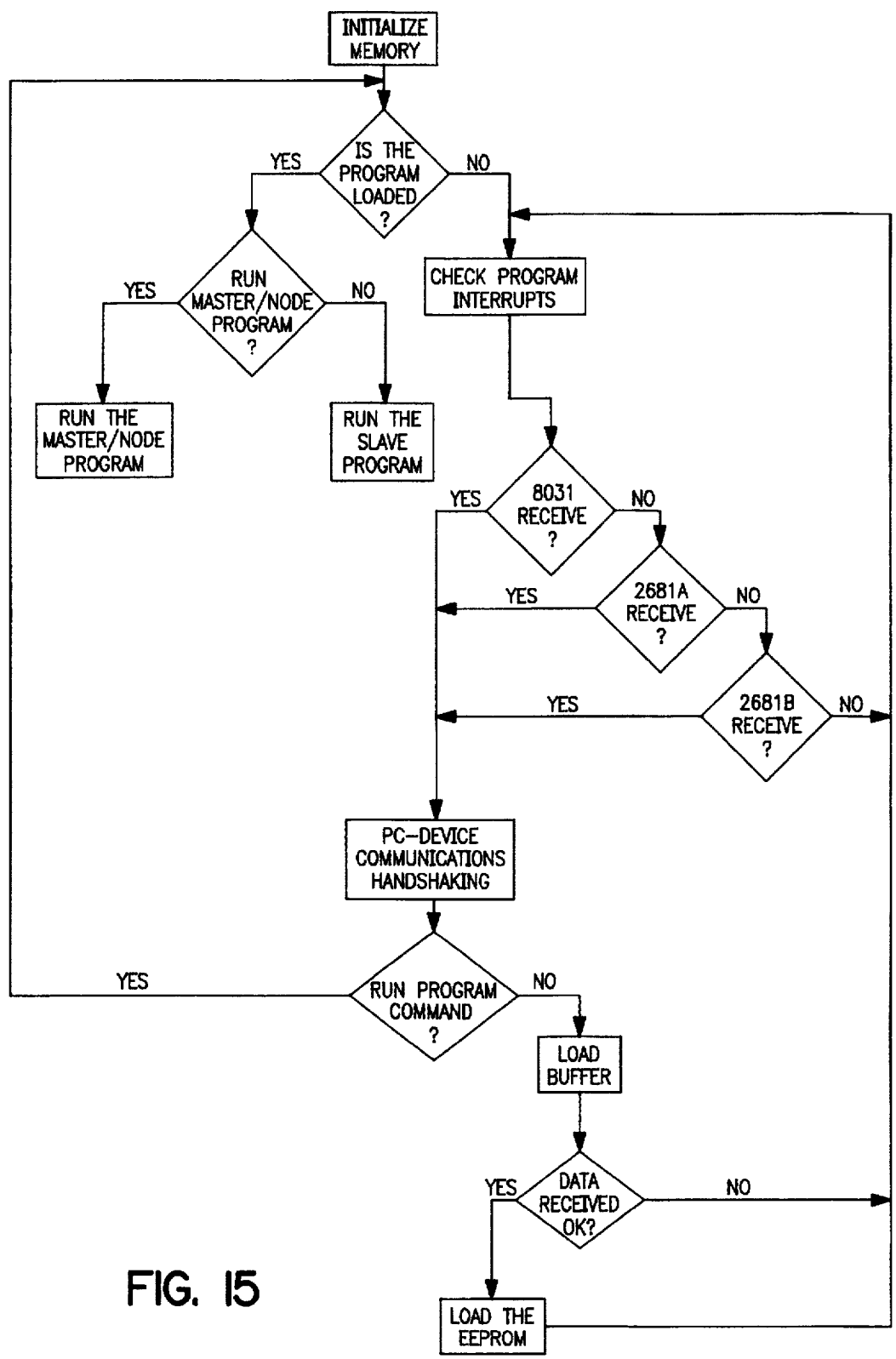
FIG. 15 is a flow chart of a subroutine for loading the operating program into the master and local nodes.
Figure 16A:
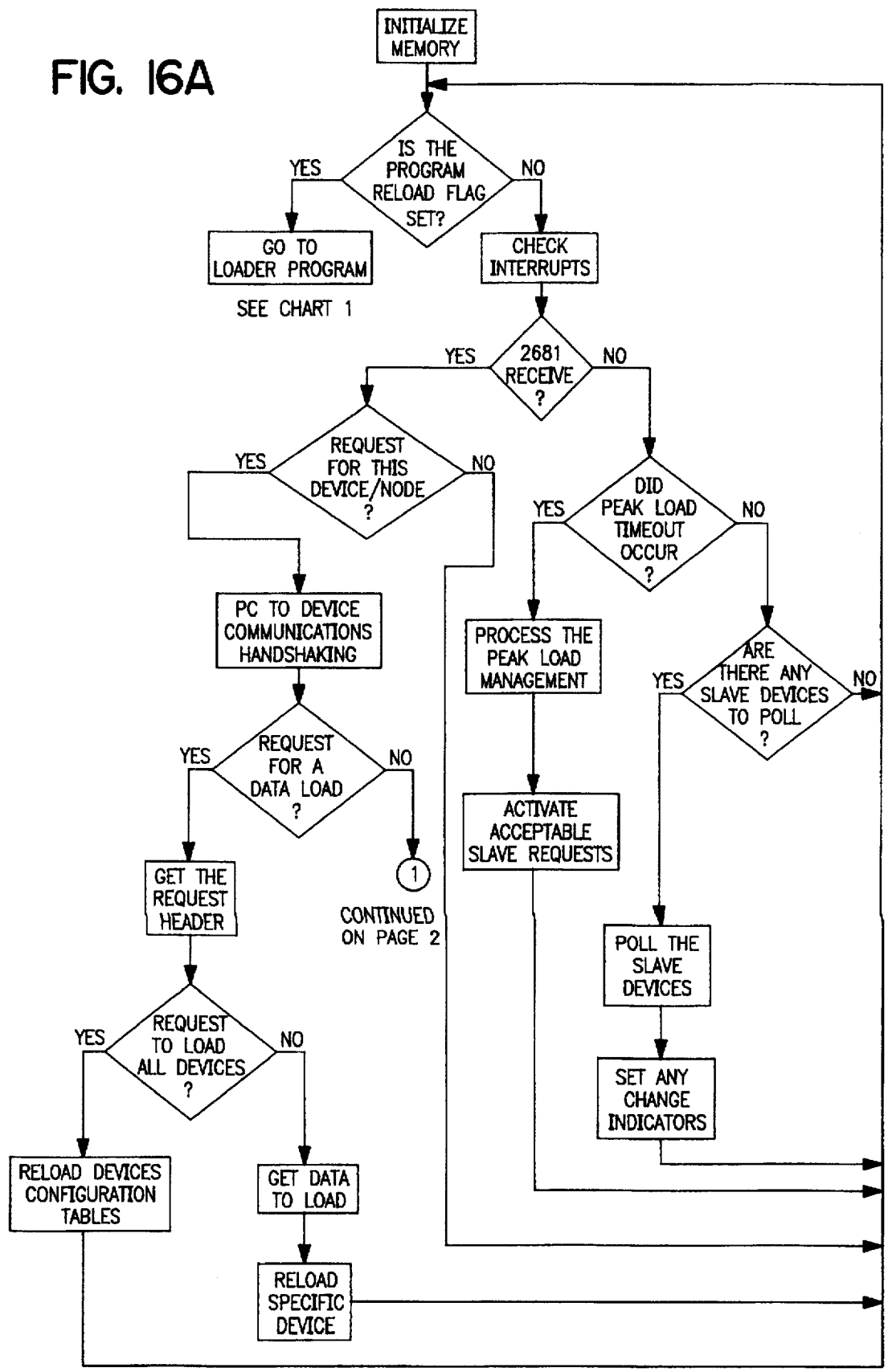
FIGS. 16a and 16b are flow charts illustrating the operation of the Local Node program.
Figure 16B:
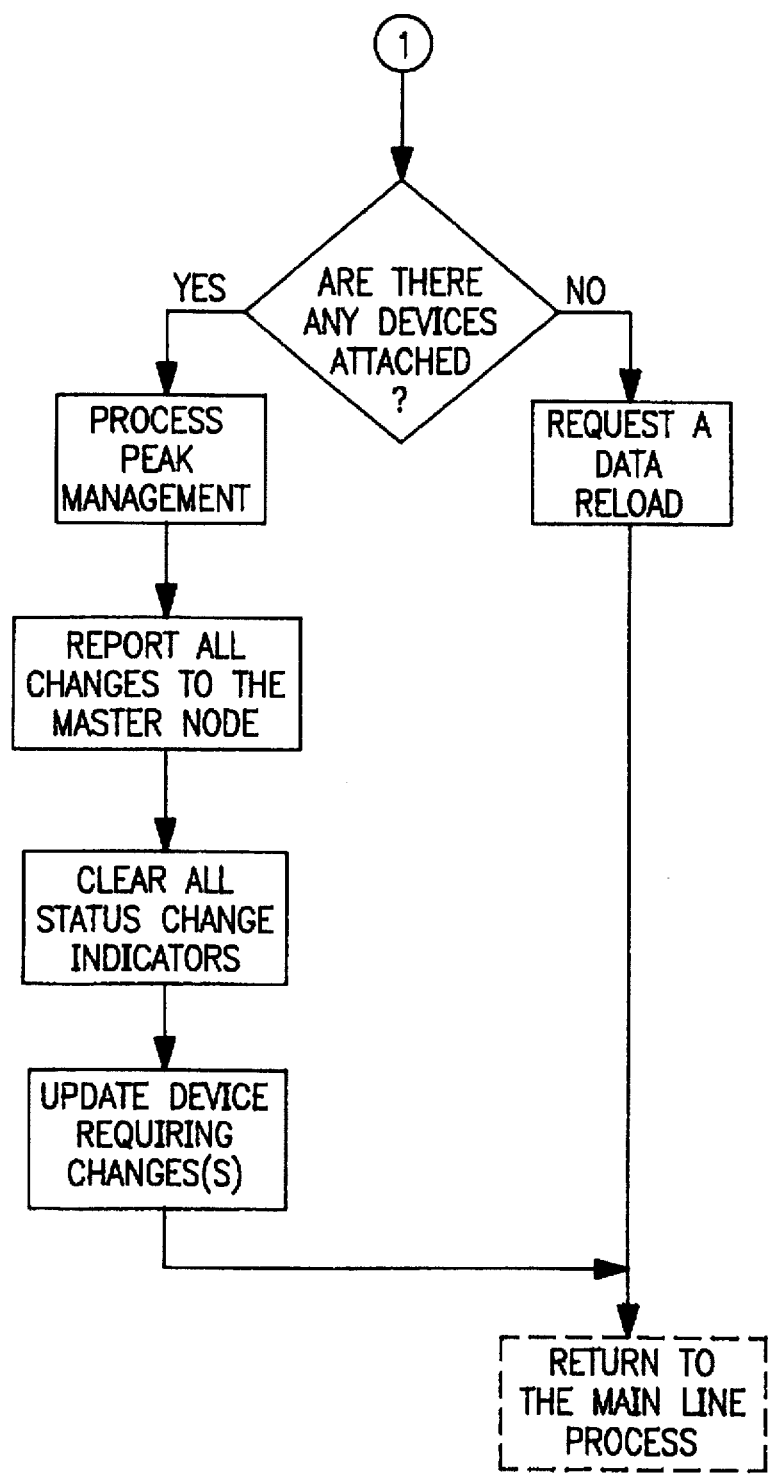

FIGS. 16a and 16b are flow charts illustrating the operation of the Local Node program. As mentioned earlier, the program installed in the local nodes is the same as that installed in the master. One part of the program is invoked when the board was designated as a master node during installation and another part of the program is invoked when the board is designated as a local node. Like master node operation, the local node continuously monitors the communications lines for interrupts and a change in the program reload flag. When the program reload flag is set, the program illustrated in FIG. 15 is invoked.

When there are no interrupts, the program first checks whether a peak load timeout has occurred. If it has, it processes a peak load management routine and activates acceptable slave (thermostat) requests and then continues to monitor communications lines for interrupts. Otherwise, the program polls the slave devices connected to it, sets appropriate indicators or flags if there are any changes in status and then continues its monitoring function.

When an interrupt is detected, the program determines whether it applies to it. If not, the interrupt is ignored. Otherwise, the program performs the necessary communications handshaking operations, determines whether a data download has been requested. If so, it reads the request header and determines whether the request applies to all devices and, if so, reloads the configuration table of all devices connected to it. Otherwise, it reloads only the specific device specified in the header. When the request is not a request for a data download to the devices, then, if there are devices attached, the program processes peak management functions, reports any changes to the master node, clear its status change indicators, updates devices which require changes and then returns to the mainline processing/monitoring operations. When there are no devices connected to the node, the node requests a data reload from the master node.

Figure 17A:
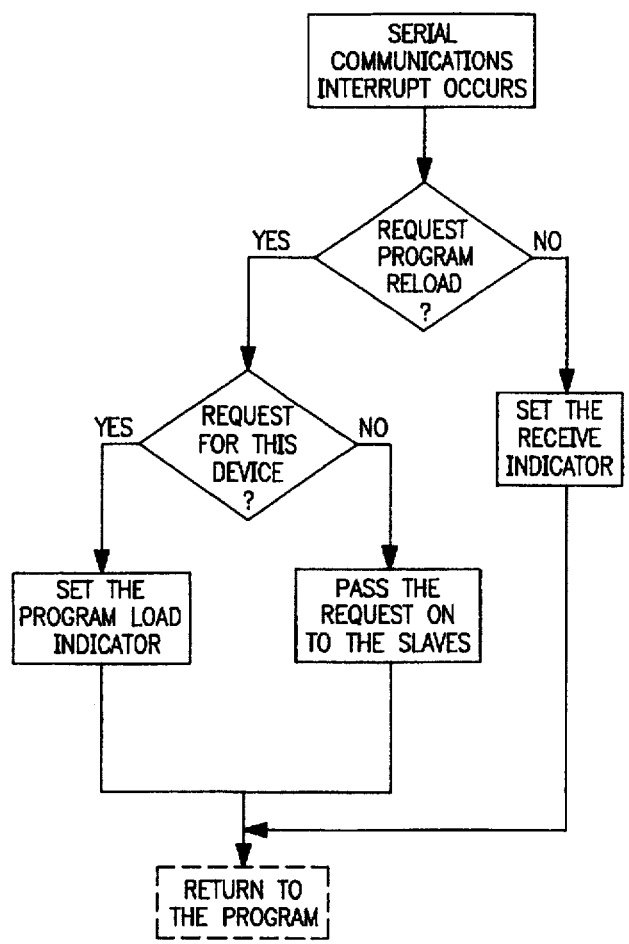
FIG. 17 is a flow chart which illustrates the Master Node to Local Node serial communication interrupt process.
Figure 17B:
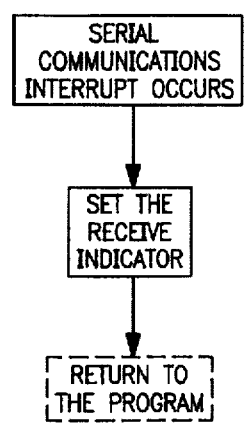

FIG. 17 illustrates the Master Node to Local Node serial communication interrupt process. As can be seen, when an interrupt is detected, the program determines whether the request involves a program reload. If so, it sets its program load indicator if the request applies to it, otherwise, it passes the request on to its slaves. If the request does not involve a program reload, the program sets its receive indicator.

Thermostats

Figure 18:
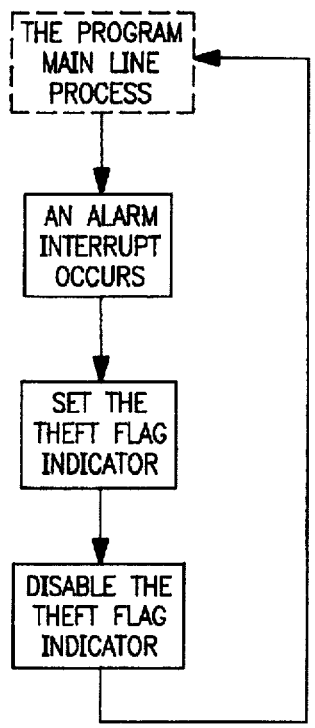
FIGS. 18, 19 and 20 are flow charts illustrating alarms, timer and serial communications interrupt processing programs.
Figure 19:
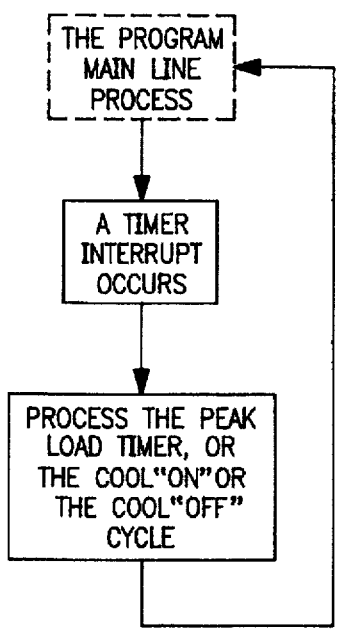
Figure 20:
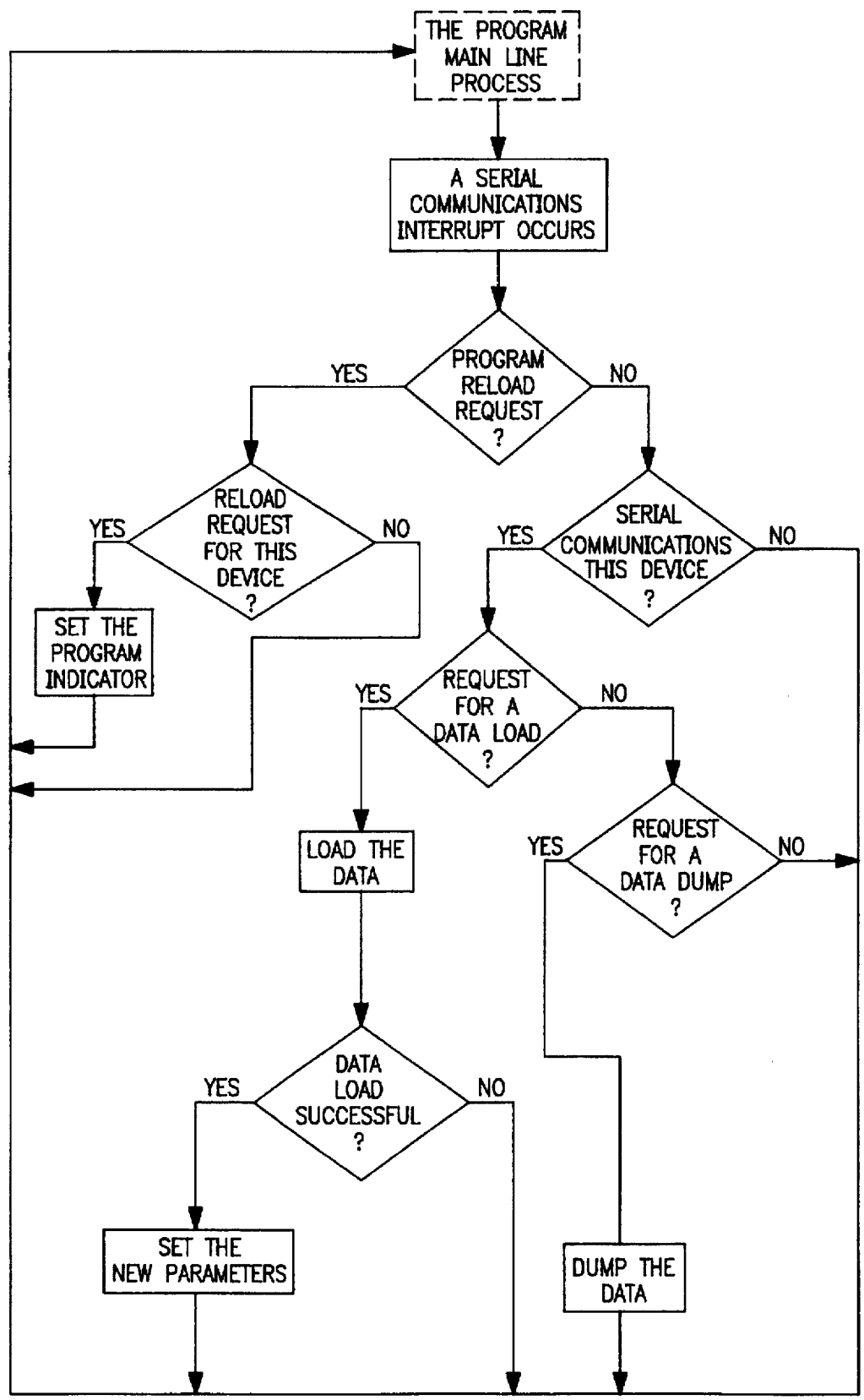

The slave devices or thermostats continuously monitor alarm, time and serial port interrupts as illustrated in FIGS. 18, 19 and 20, respectively. As shown, when an alarm interrupt occurs, a theft flag indicator is set for subsequent transmission to the master node and onward to the main computer. When a timer interrupt occurs, the program performs peak load management processes or turns the cooling ON or OFF, whichever is appropriate. When a serial port interrupt occurs, the program determines whether the interrupt involves a program reload request and if so sets its program reload indicator if the request applies to it. Otherwise, it ignores the program reload interrupt. When the interrupt is not a program reload interrupt, then, if the interrupt is addressed to it, it determines whether the request is for a data load or a data dump and then responds accordingly. When the request is for a data load, it transmits an appropriate acknowledgement signal back to its master node and updates its configuration table.

Figure 21A:
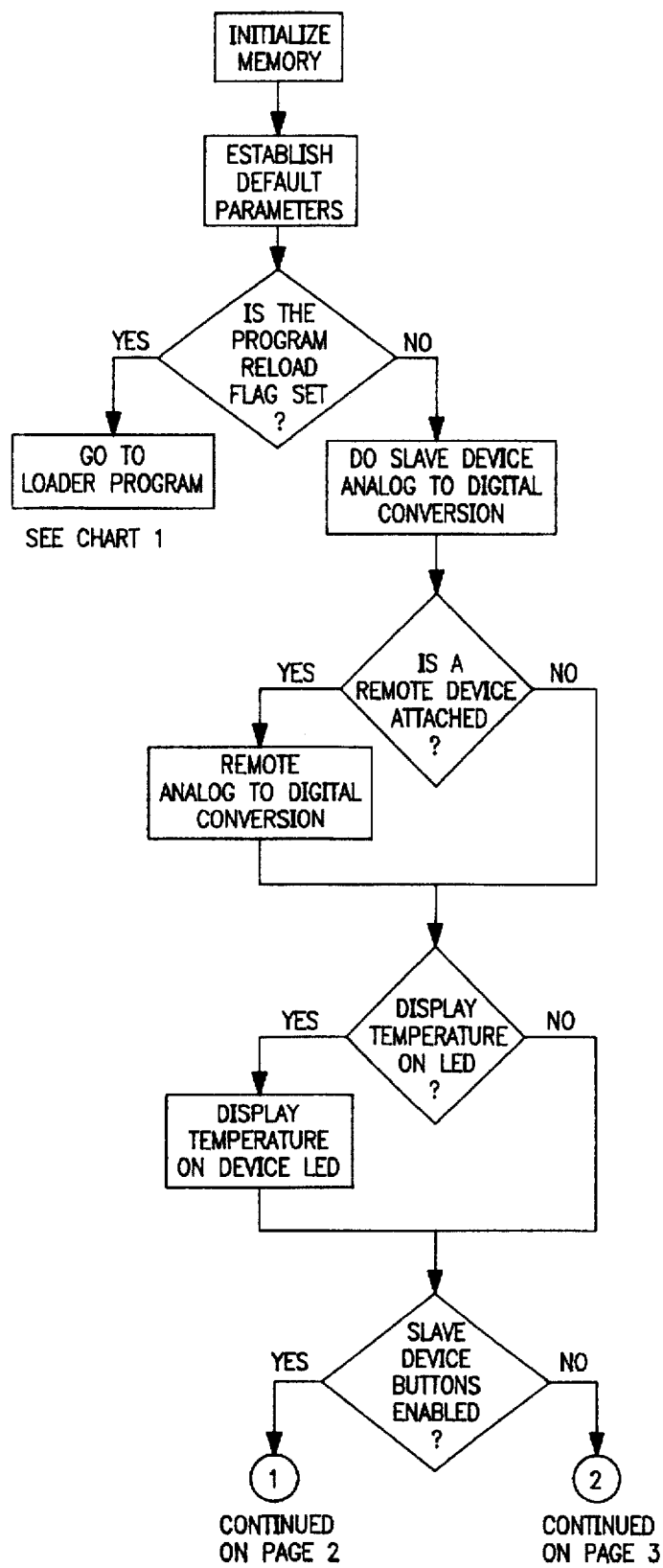
FIGS. 21a, 21b and 21c are flow charts illustrating the operation of the slave or thermostat program.
Figure 21B:
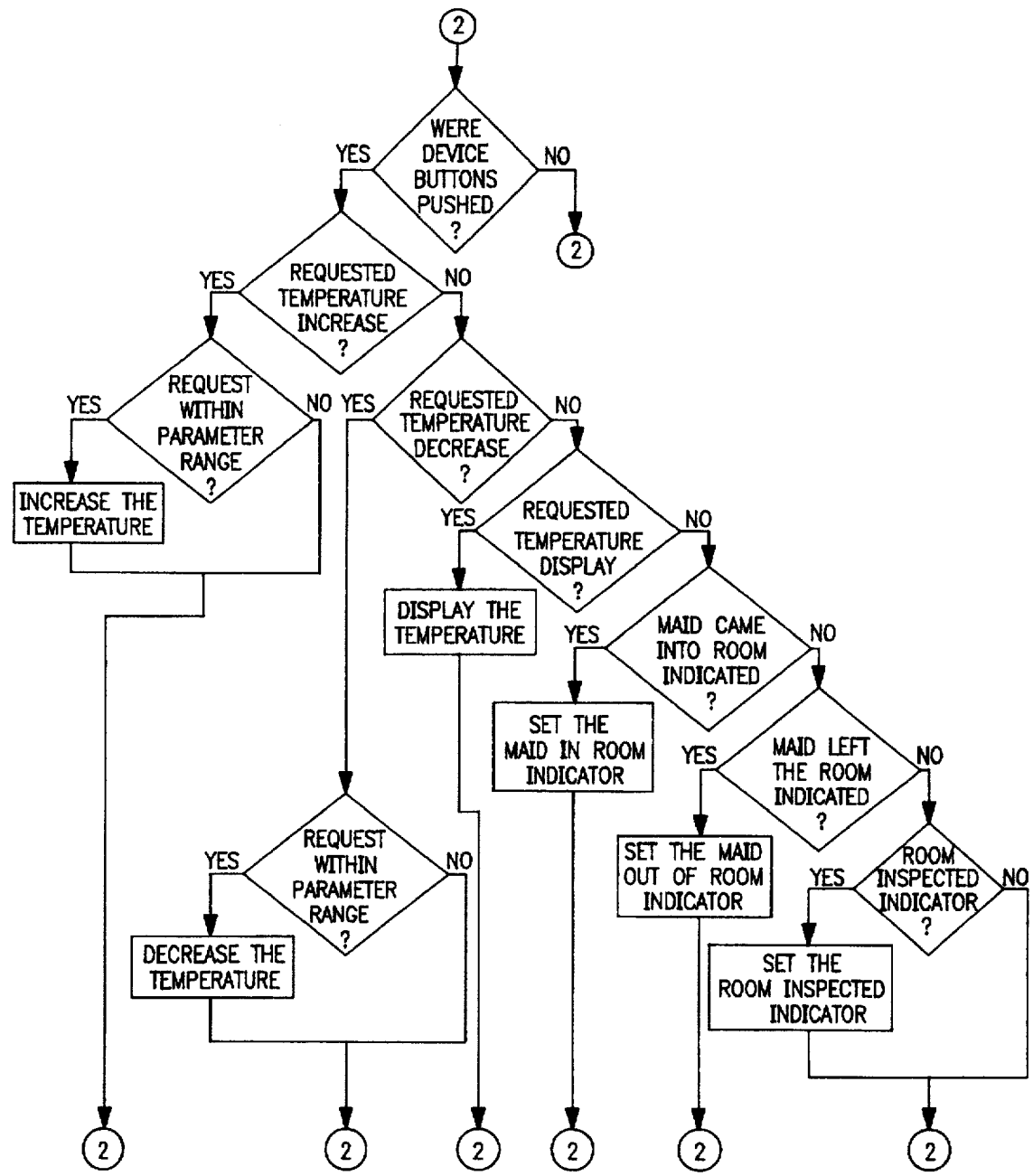
Figure 21C:
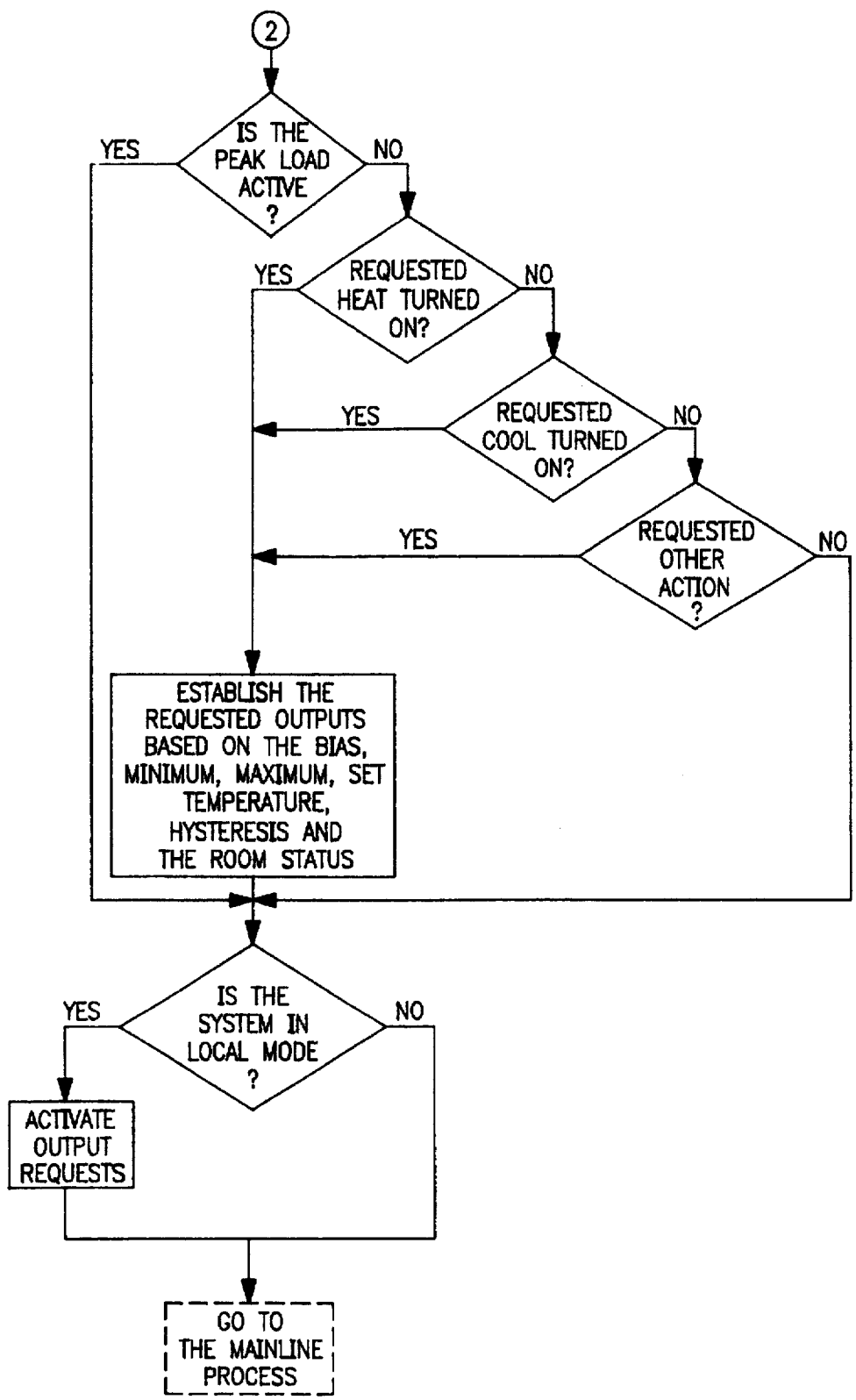
Figure 22:
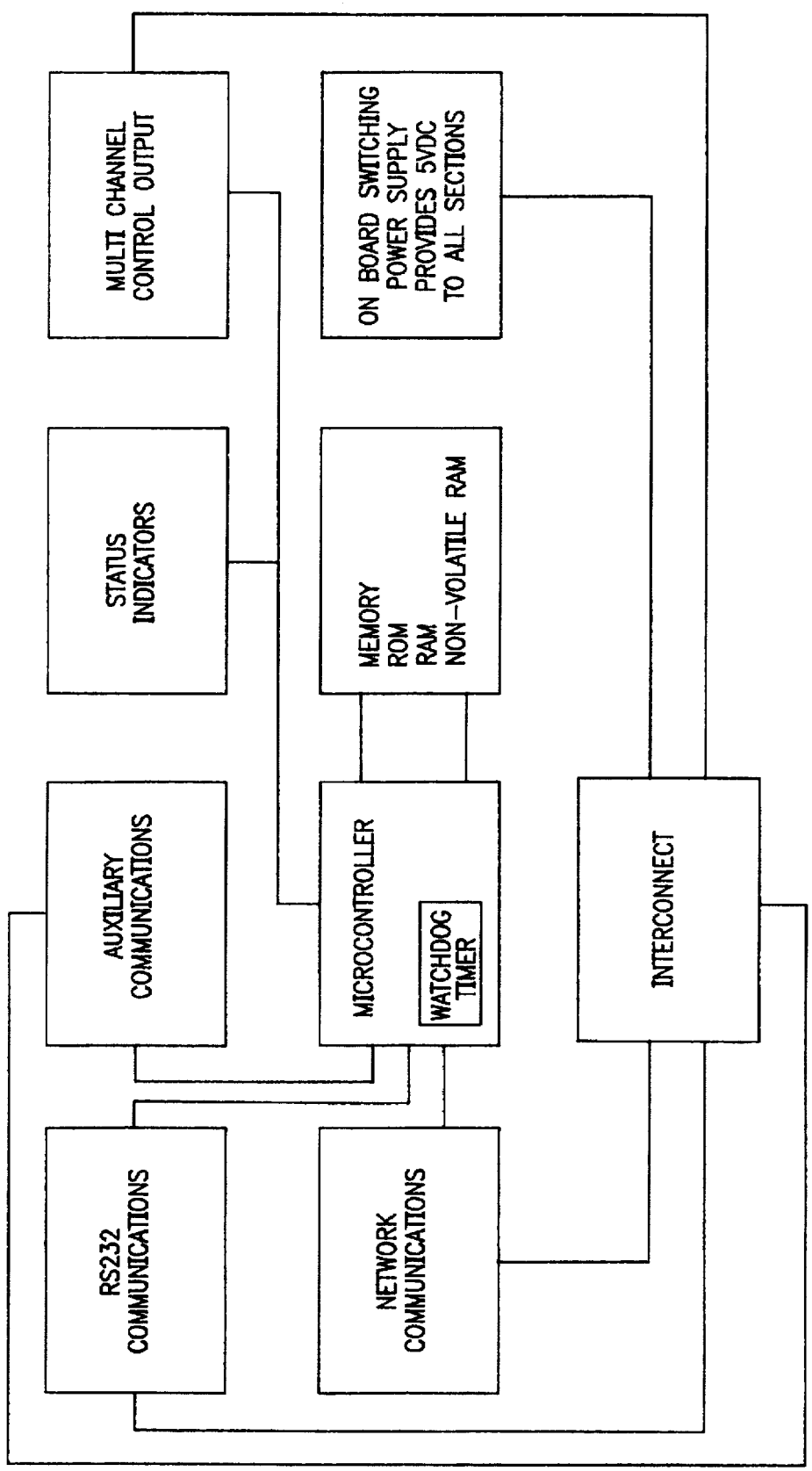
FIGS. 22 and 23 are block and circuit diagrams, respectively, of the master and local nodes according to a preferred embodiment of the present invention.
Figure 23A:
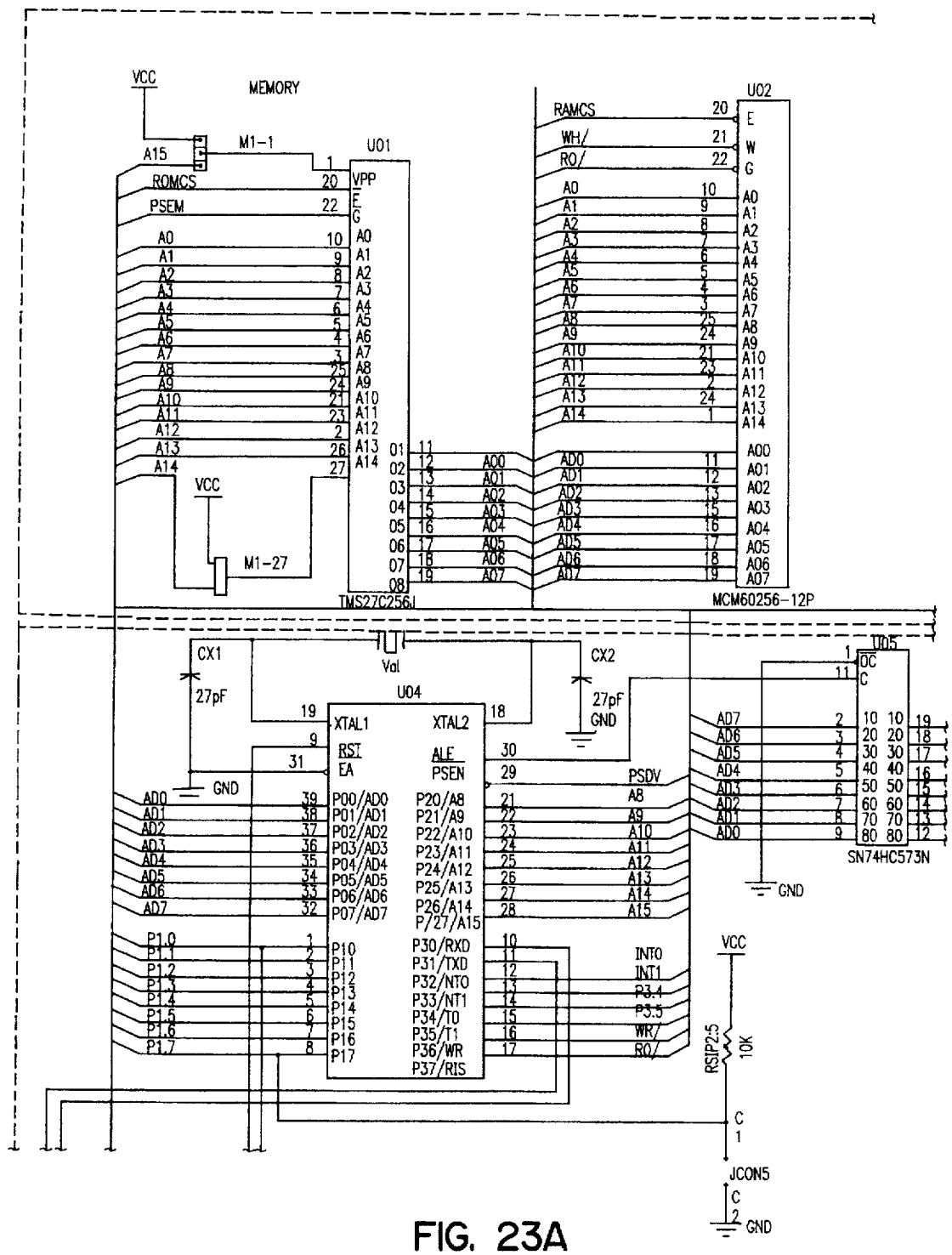
Figure 23B:
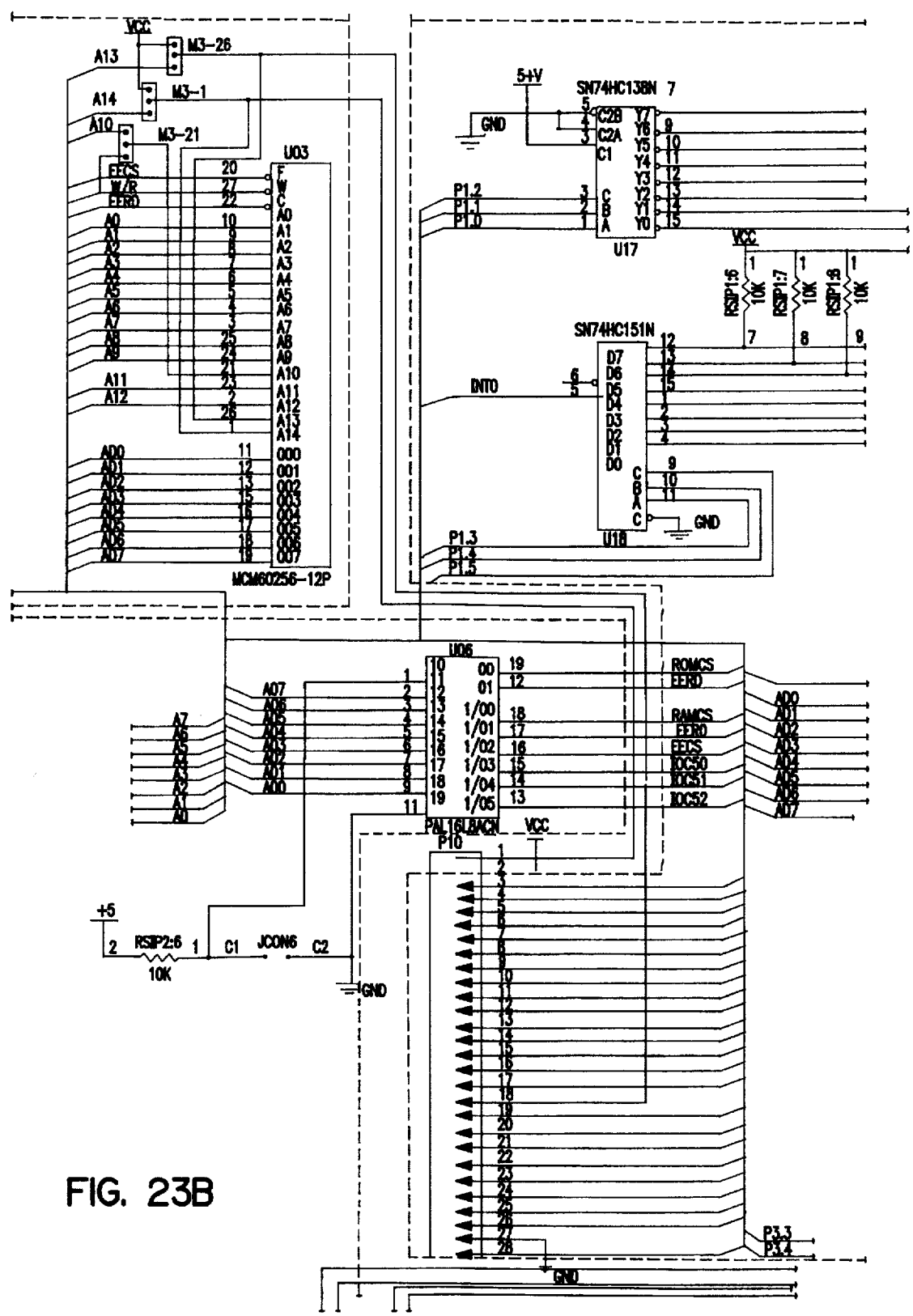
Figure 23C:
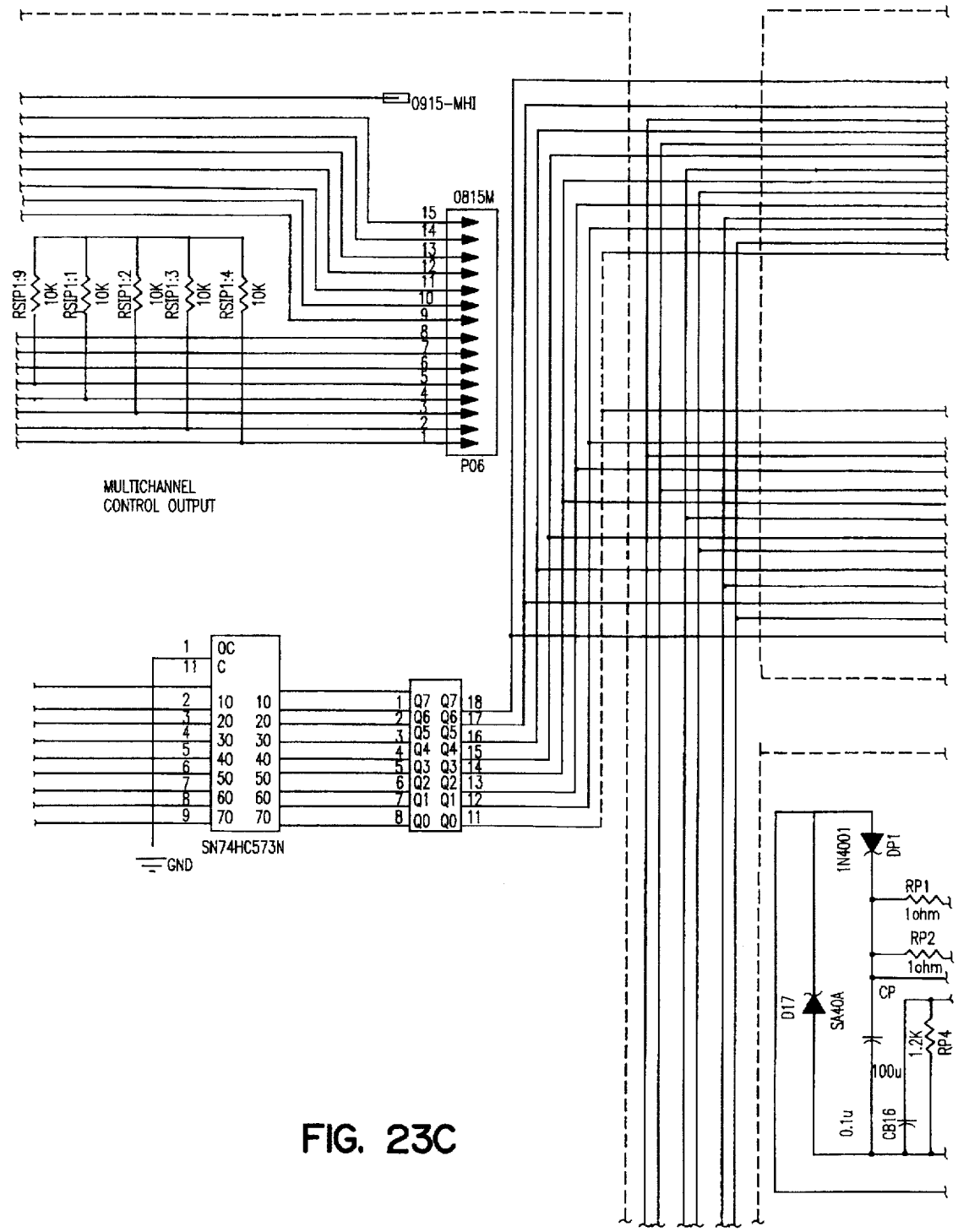
Figure 23D:
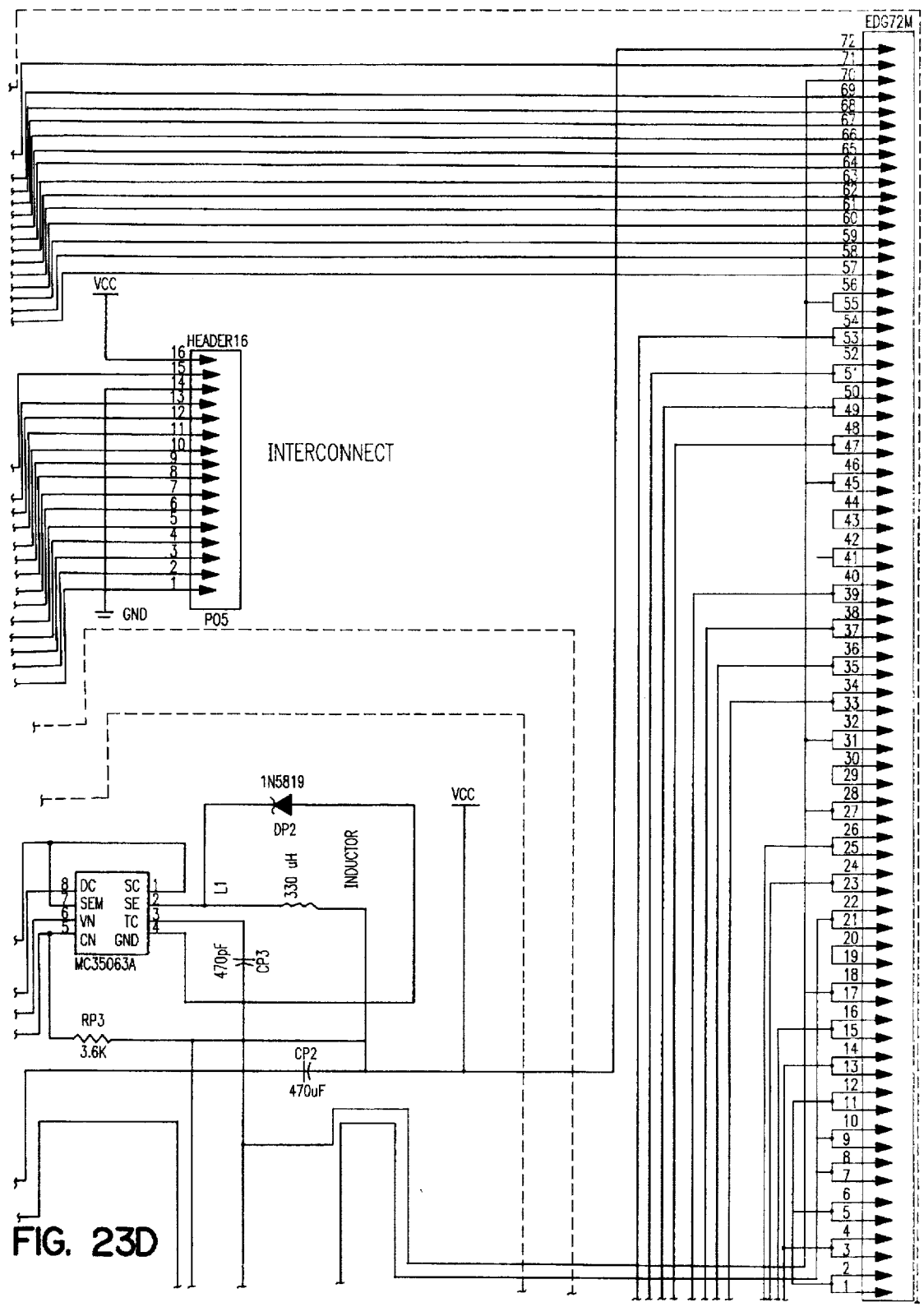
Figure 23E:
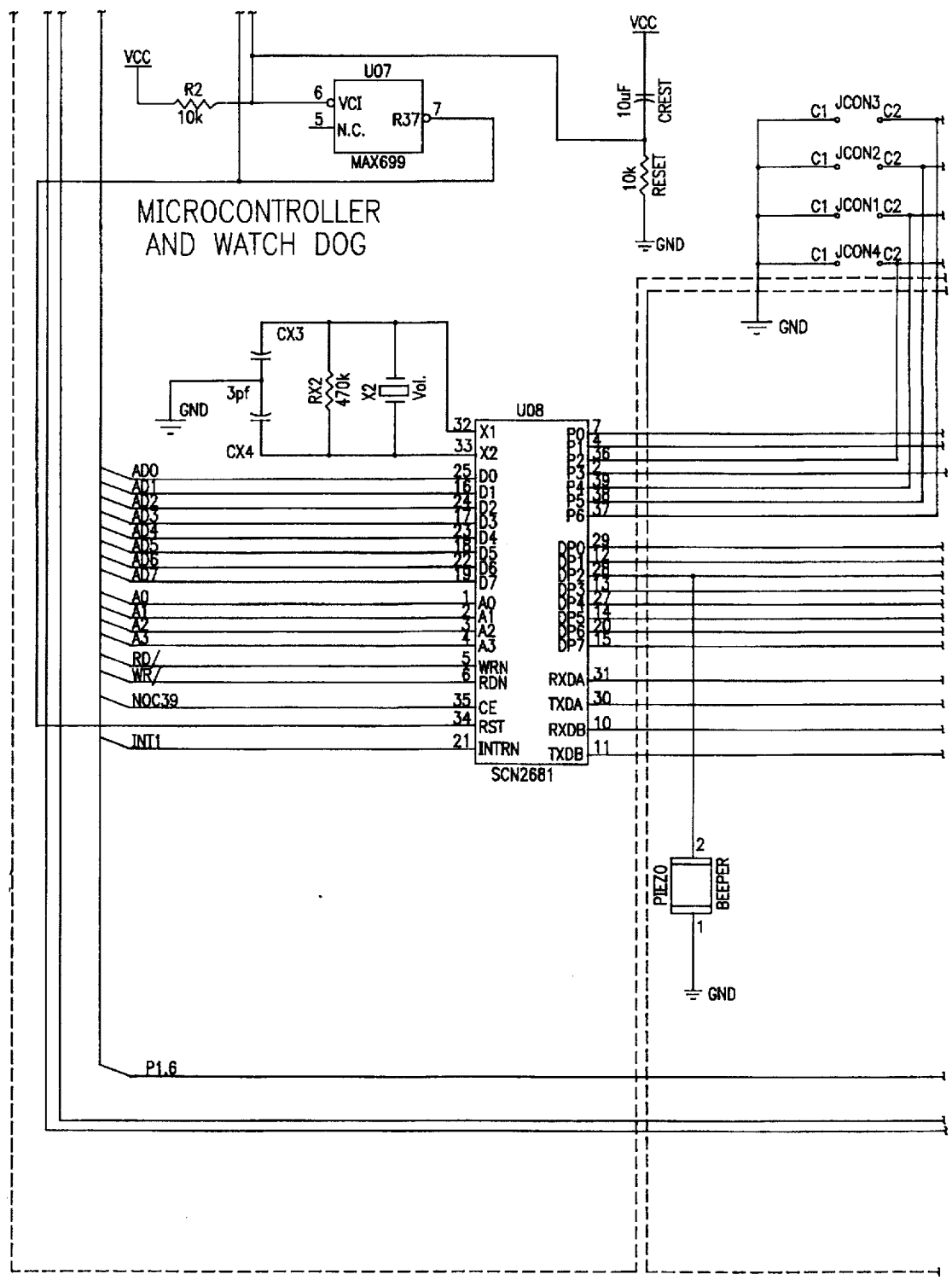
Figure 23F:
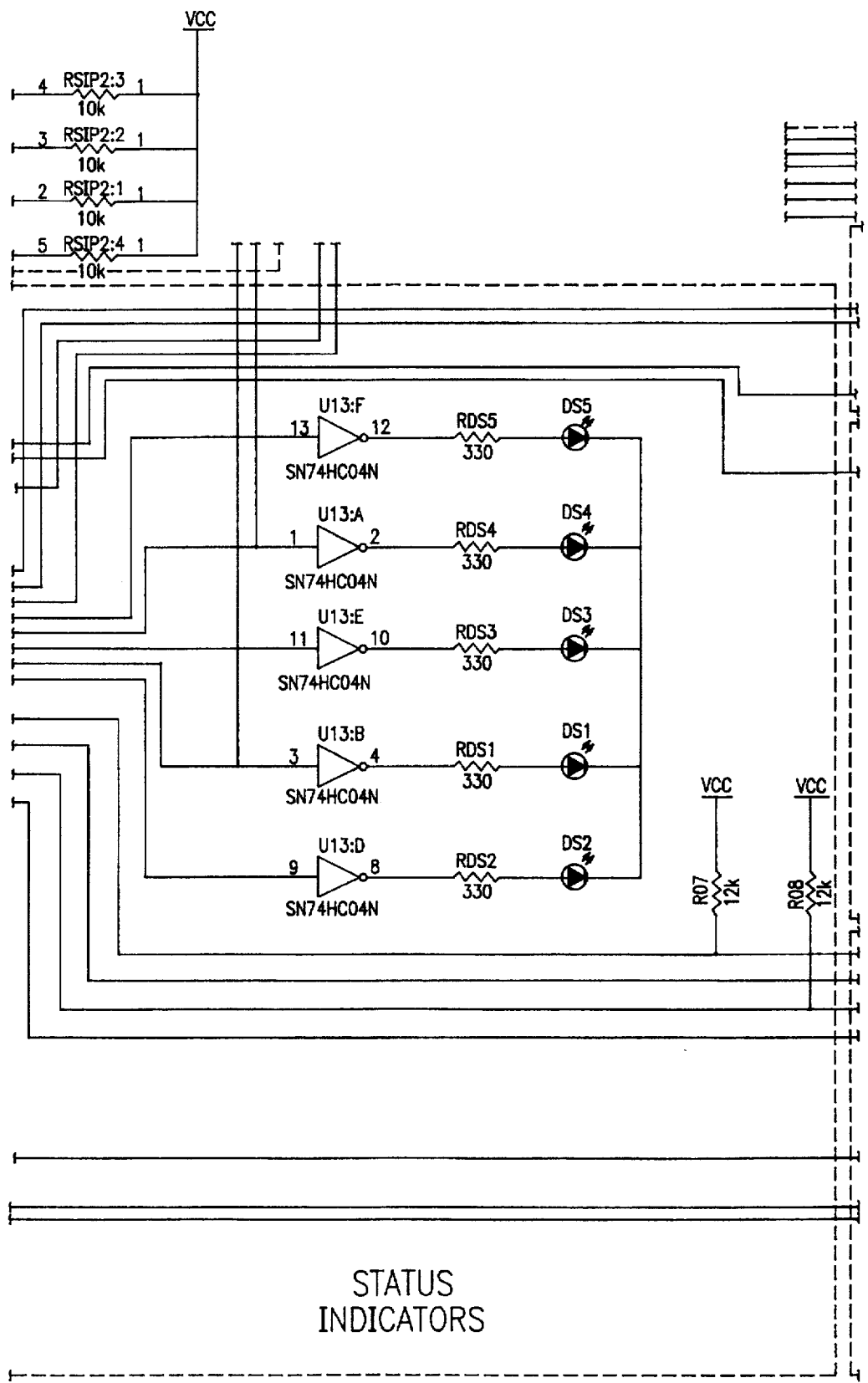
Figure 23G:
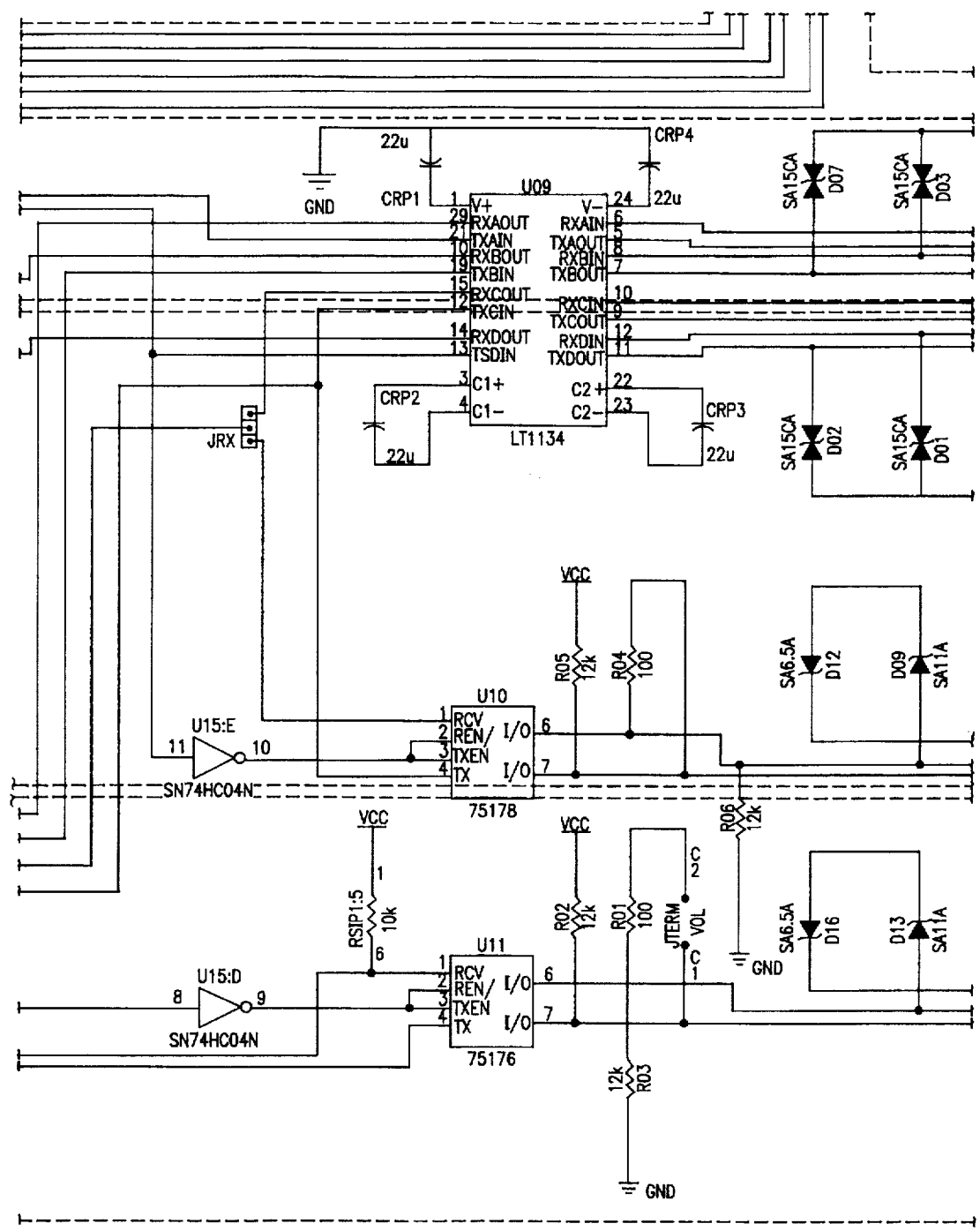
Figure 23H:
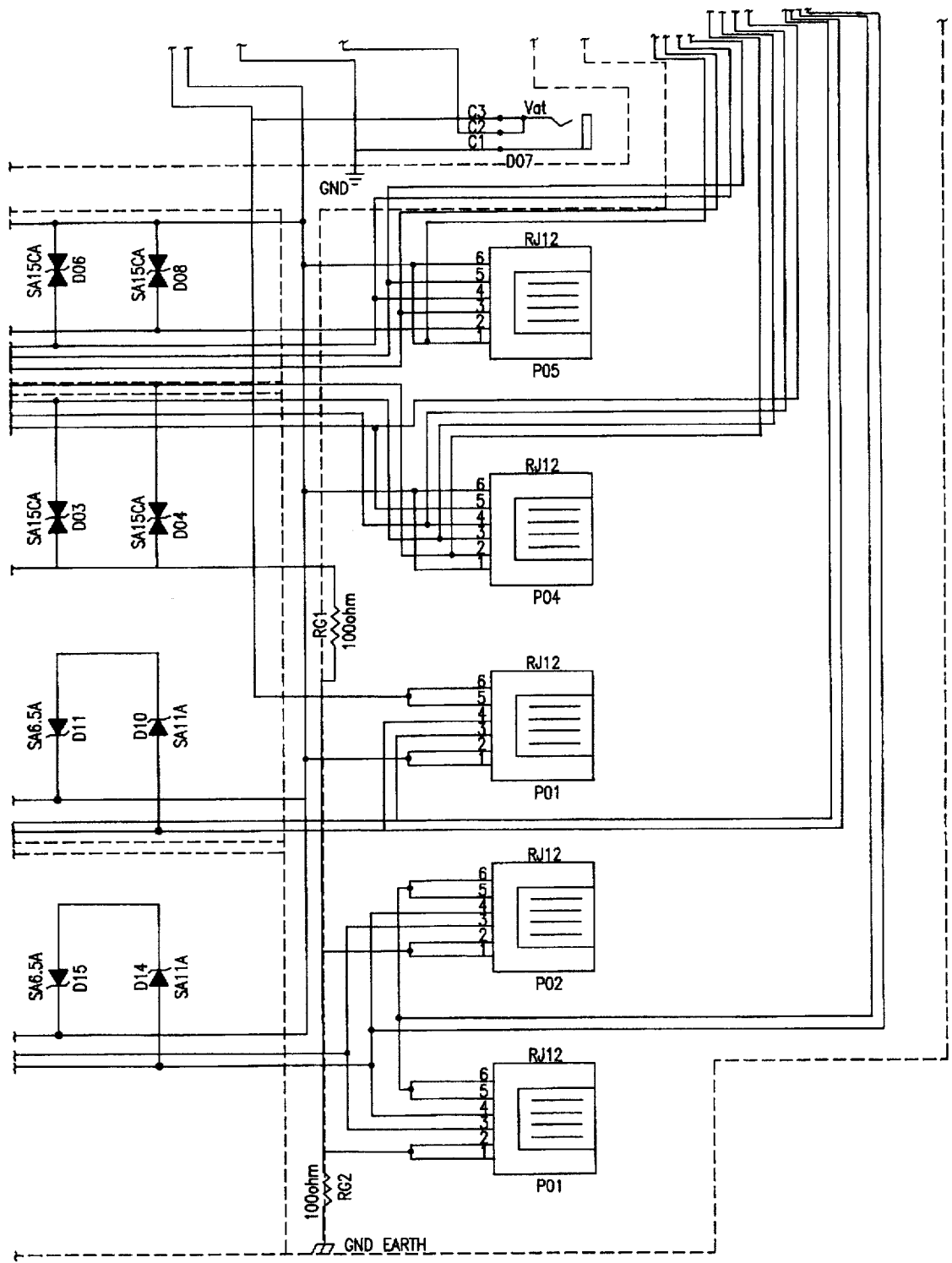
Figure 24:
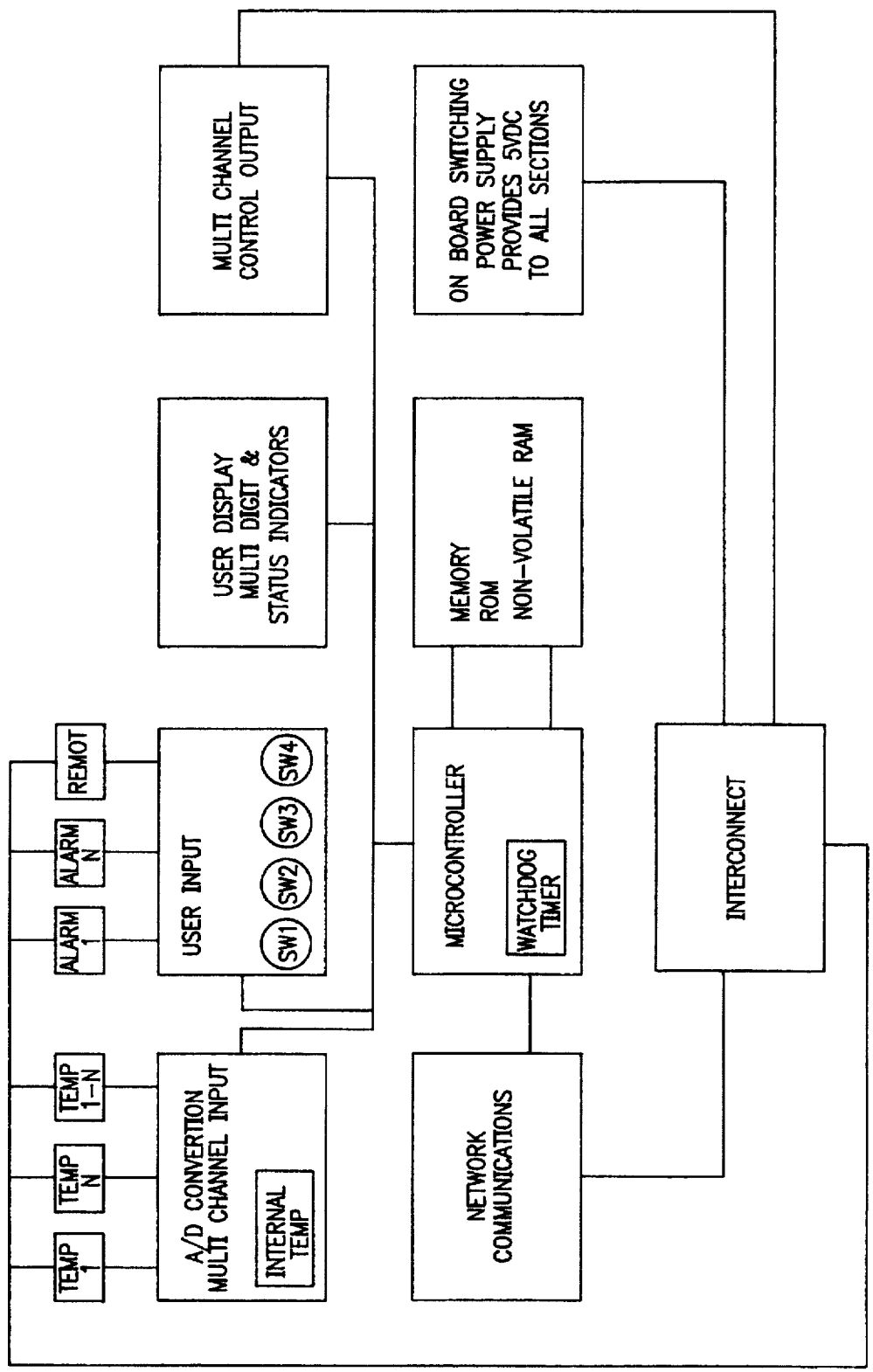
FIGS. 24 and 25 are block and circuit diagrams, respectively, of a thermostat according to a preferred embodiment of the present invention.
Figure 25A:
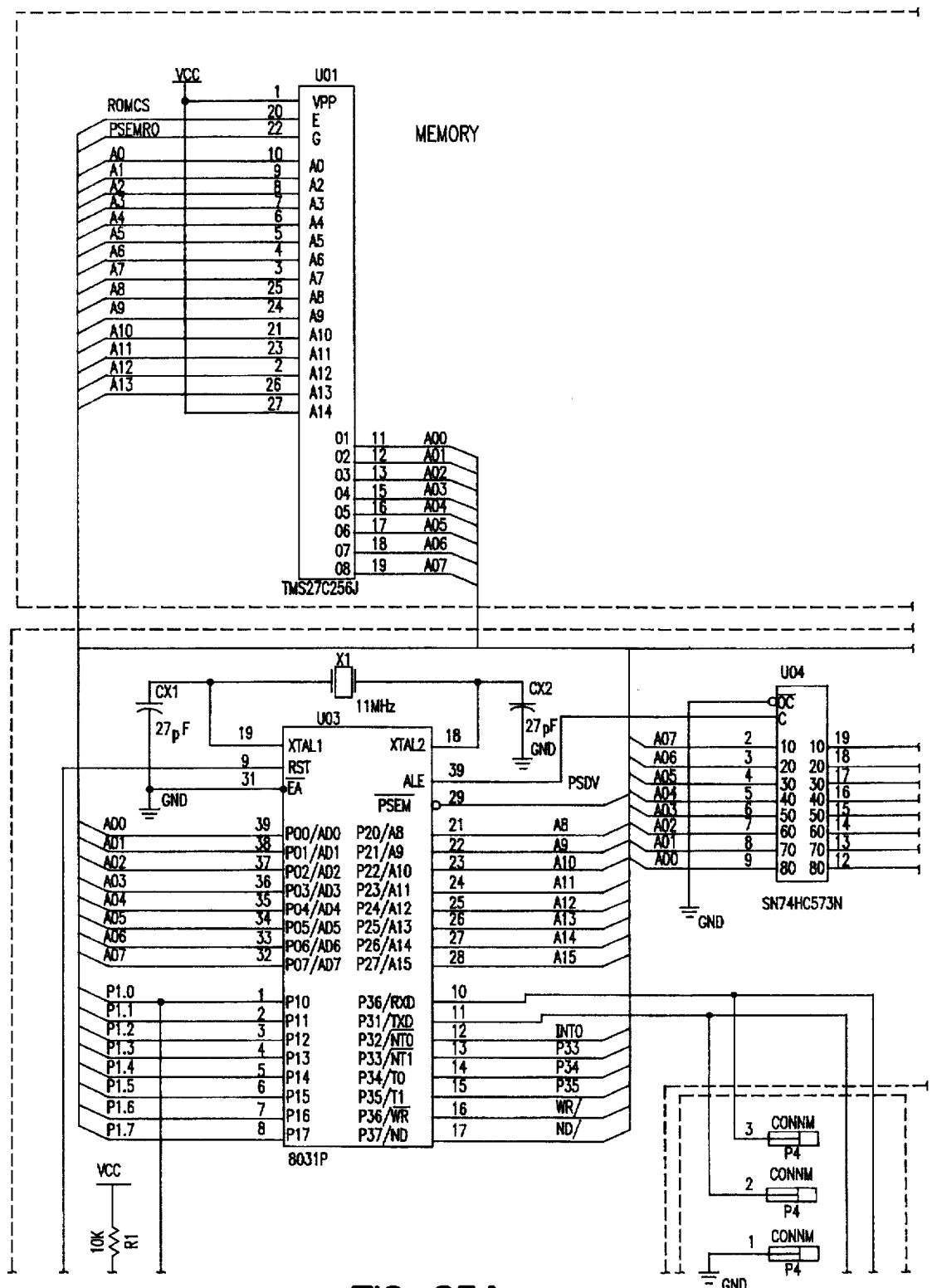
Figure 25B:
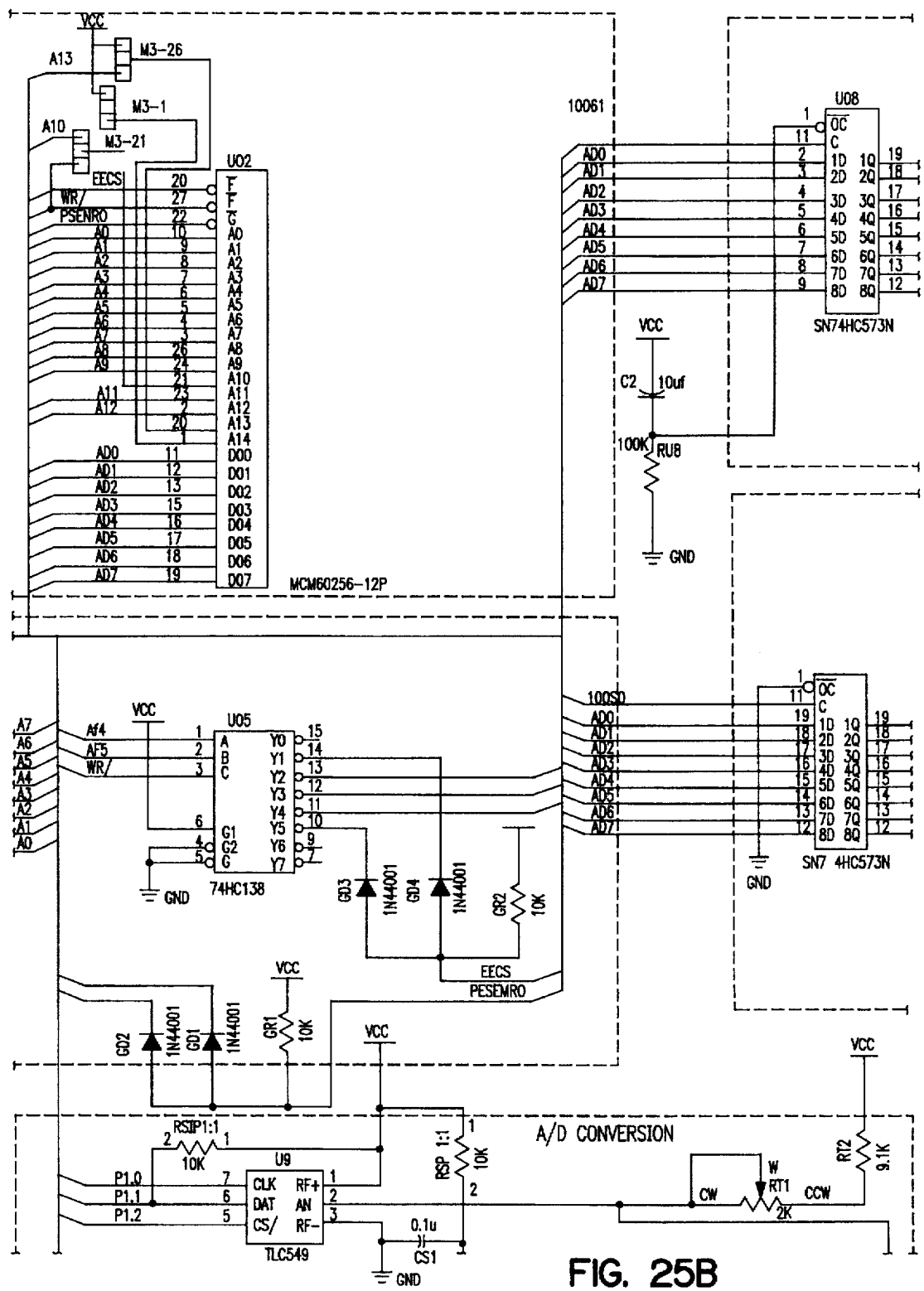
Figure 25C:
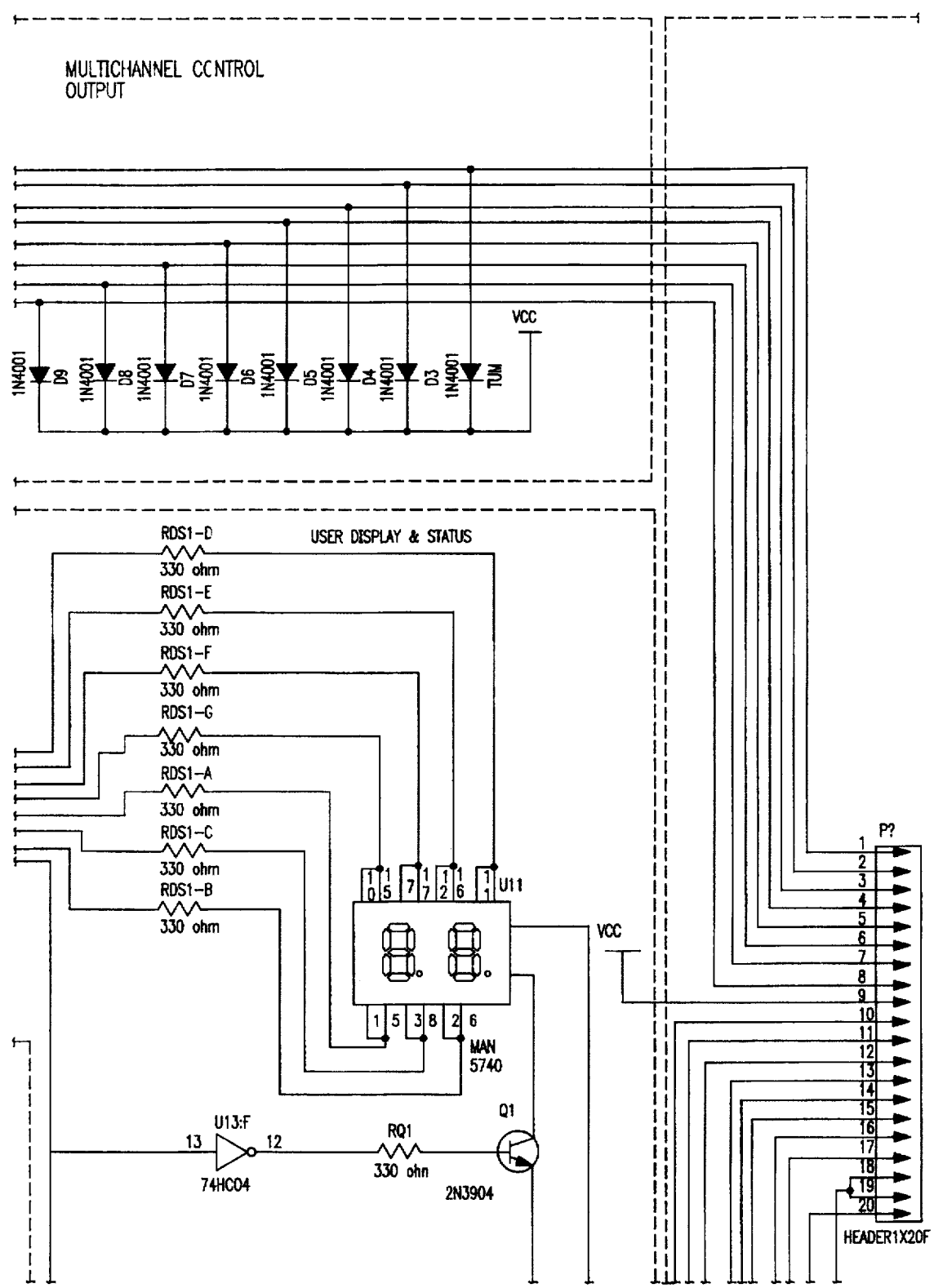
Figure 25D:
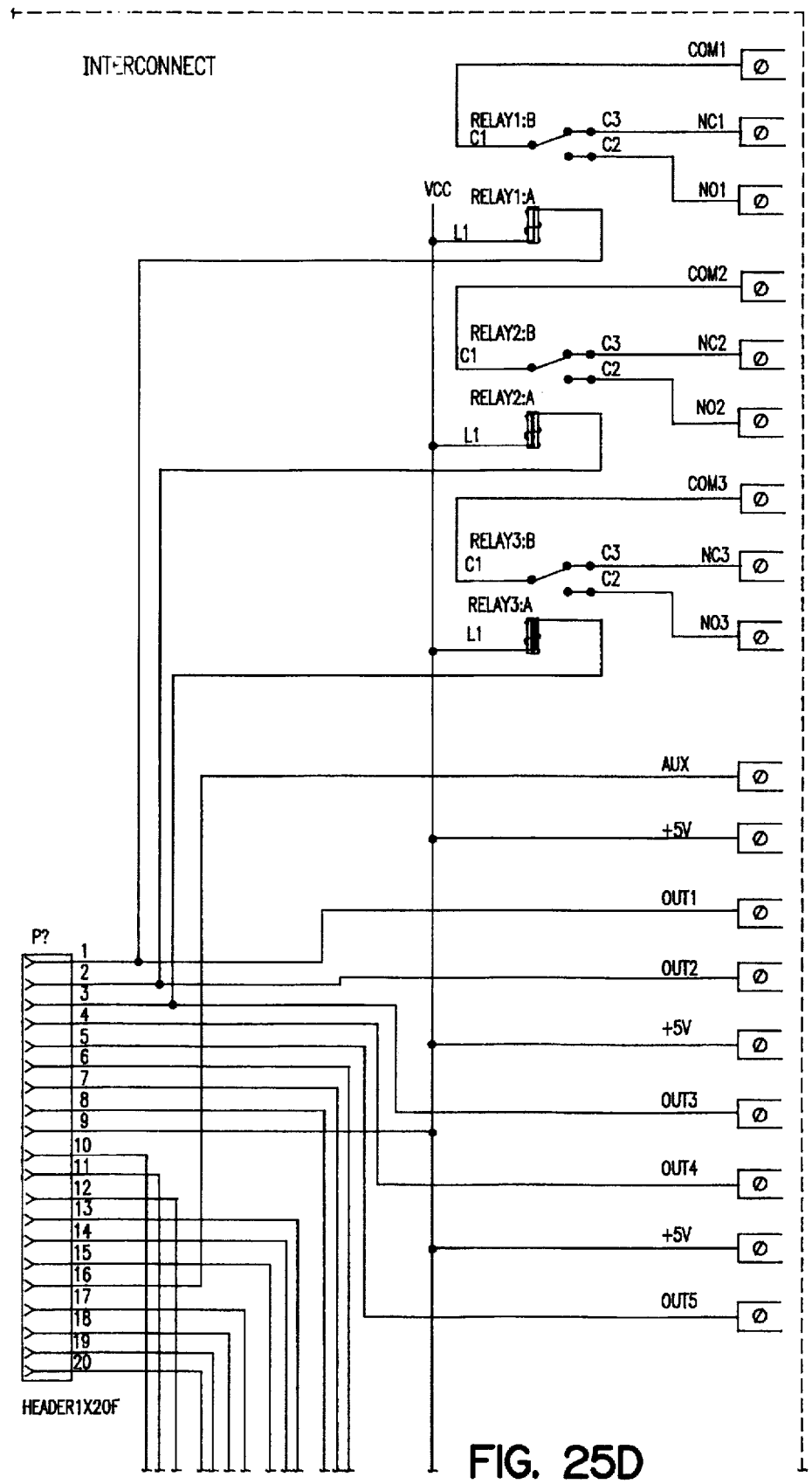
Figure 25E:
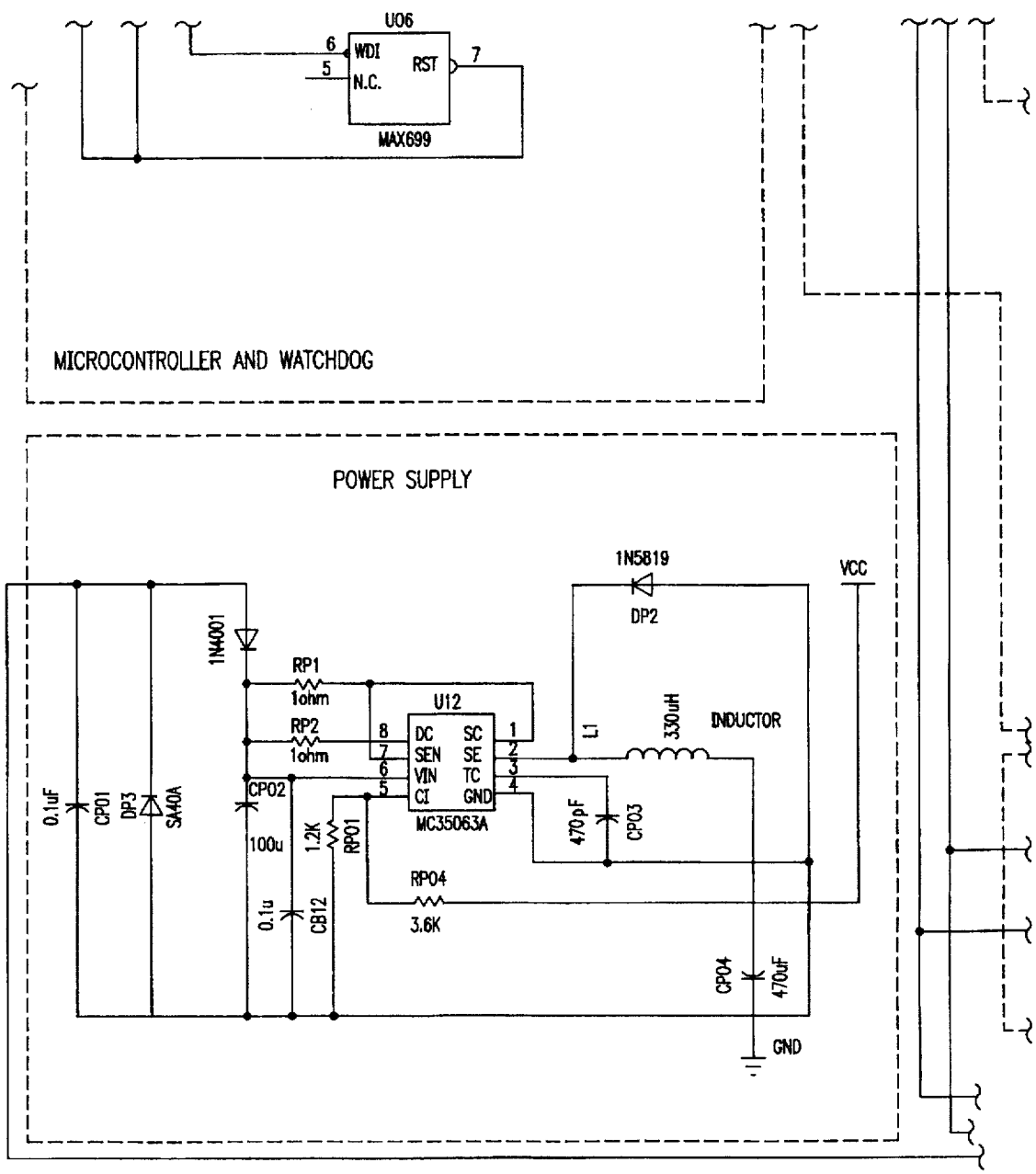
Figure 25F:
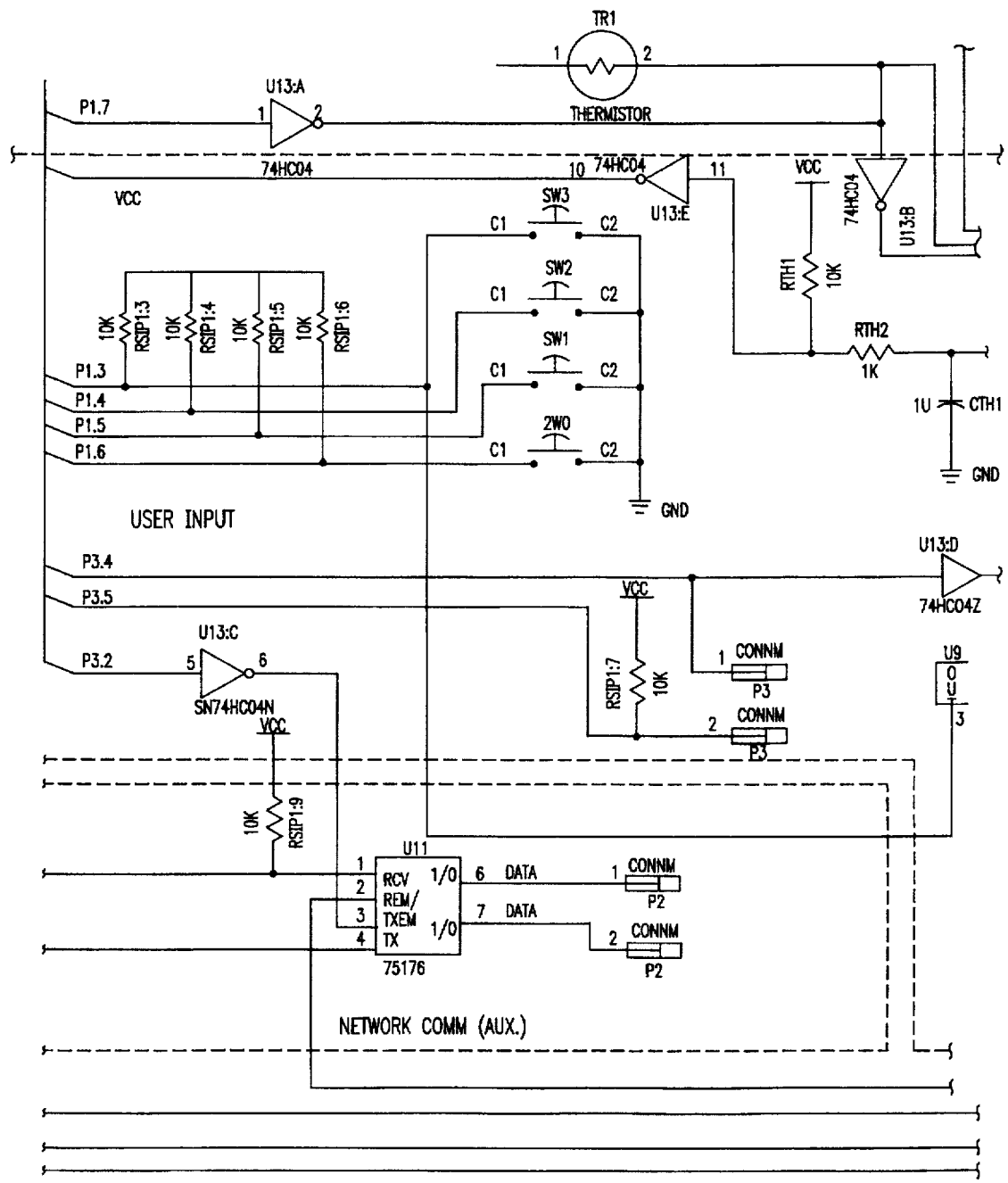
Figure 25G:
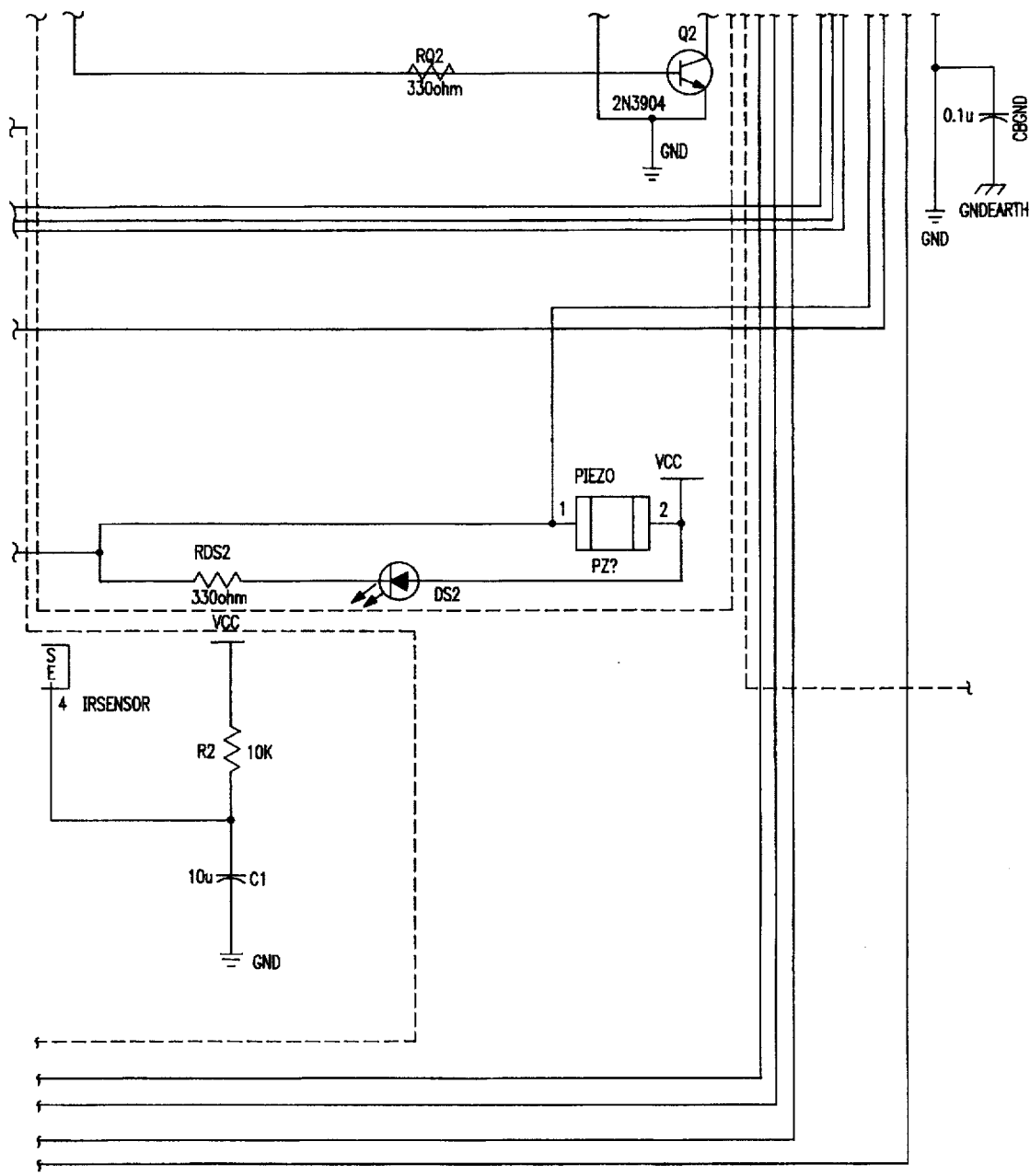
Figure 25H:
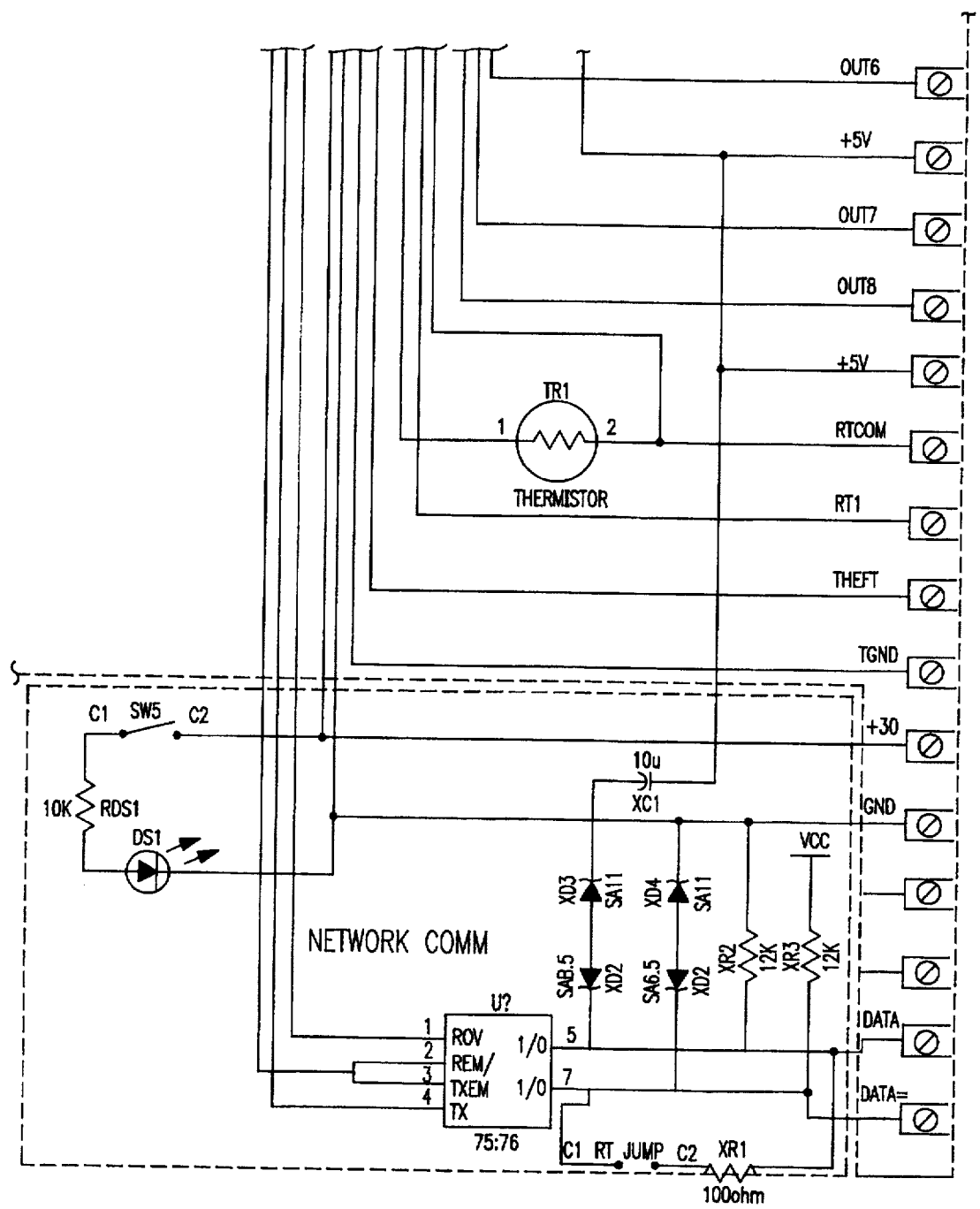

Referring to FIGS. 21a, 21b and 21c, when the program finds the program reload flag set, it invokes the program reload subroutine illustrated in FIG. 15. Otherwise, it effects a slave device analog to digital conversion, effects an analog to digital conversion for any remote devices connected to it, determines whether the temperature is to be displayed and checks whether any of its buttons have been depressed. If none of its buttons have been depressed, then, if the peak load is active (see FIG. 21c) and it is in local mode, it activates output requests and returns to mainline processing. Otherwise, it checks whether the requested heating, cooling or other action is to be effected and if so establishes the requested output provided they are within the bias, minimum, maximum, set temperature, hysteresis and room status parameters. This is followed by activating output requests when the system is in local mode. The program then returns to normal mainline processing.

Referring to the bottom of FIG. 21b, when one of the buttons has been depressed, the program confirms which button was depressed and processes the request accordingly. Note that a temperature increase or decrease is invoked only if the request is within the range specified by the parameters downloaded from the main computer via the master node. Note also that the thermostat includes a "maid in room"indicator, a "maid left room indicator" and a "room inspected" indicator. The status of all of these indicators are reported to the master node during periodic status checks by the master node as already described.

The preferred embodiment of the thermostats contains circuitry capable of providing conversion of multiple analog signals to digital, which are typically eight bit. Because the thermistor and humidity sensors have inertia, fast and frequent conversion is not necessary. The sampling and conversion performed at the thermostat is directed by the microcontroller. An onboard thermistor sensor provides ambient sensing and optional remote sensors can accommodate additional zones within a room. The thermostat is capable of interfacing to voltage or current type sensors.

The user input is made possible by single bit logic inputs which connect switches to the microcontroller allowing for the end users adjustment of operation parameters such as setting temperature. The preferred embodiment will have four such switches available. Additional buffer inputs would allow for the connection of remote devices such as theft alarm, fire alarm, emergency call buttons, or door and window switches, and may be used with a variety of movement or people detectors. The microprocessor also permits connection to digitally or frequency encoded sensors, PWM, serial dated, post, count type, or VFC.

The thermostat contains a multi-digit display which provides a visual indication of the operation of the unit. The indications include: set temperature; actual temperature; signal mode; loading; and program status. Both the thermostat and controllers in their preferred embodiment possess multi channel control output capacity. The electrical driver circuit adapts microcontroller CMOS level signals to remote appliance switchers which can be used to control such systems as high power relays, low voltage control systems, and pneumatic and mechanical systems. Multi-voltage, open collector or differential outputs are able to interface with the thermostat to different load and power control devices. The output configuration includes sink and source current, current loop, pulse output for latching, multi frequency signalling, pulse width modulation, differential drive and multiplex and serial data.

Network Communications

The network communications incorporates a half duplex RS485 standard Communications adaptor. Line balancing and line protection circuitry prevents any transient damage and is capable of stabilizing the line. To prevent transmitter failure, automatic hardware will default to receive instantly on power up. In the event of power loss a tri-state connection goes to high impedance.

System interfaces to low cost twisted pair wire allows for connection of devices over distances of several kilometers.

The master controllers use one (1) RS485 and two (2) RS232 communication ports, the controllers use two (2) RS485 communications ports and the thermostats incorporate one (1) RS485 communication port.

The onboard switching power supply comprises a DC/DC converter which provides a highly stable 5 VDC at 300 ma demand for onboard circuits. A pulse power source provides a high impedance isolation source for driving high current mechanical latching relays. Network failure caused by a faulty or shorted thermostat is prevented due to current limited output reduction. Voltage fluctuation and spikes which cause anomalies and can be responsible for damage are prevented by zener and transorb circuits.

An rf suppressor prevents interference from external noise sources and is capable of dampening internally generated rf noise. An input diode prevents accidental damage from any reverse polarity connection and a connector failsafe switch connects to ground before connecting to positive leads which prevents damage to the circuit that would be caused by gat connection through output devices.

In both the thermostat and controller ROM or EPROM chips hold the loader and operations routines. EEPROM stores the thermostat operational program as well as the thermostat parameters. A microcontroller chip RAM stores variables and current operating parameters for the thermostats. Contained within the RAM memory are parameter tables and peak demand variables found in the controllers. The RAM must be reloaded by the system after each power interruption.

In the case of both the controller and the thermostat, a two board system is employed. A wire fastener mechanism provides easy access to all connections on a baseboard; field wiring connects to the board and a power indicator LED and test circuitry permit testing and verification of wiring before installation of the thermostat. A board to board connector secures the thermostat to the field wiring board when the thermostat is mounted. A safety interlock switch enables the thermostat to receive power after the seating of the connector.

Microcontroller

The microcontroller used for both the controller and thermostat locks is a standard single chip microprocessor—microcontroller which includes a communications adaptor, memory management, clock oscillator, reset control, watchdog timer, interrupts, input and output bit boards. The microcontroller executes a program stored in external EPROM or EEPROM chips. The onboard watchdog timer ensures proper operation of the unit under adverse conditions. A trigger of the watchdog timer caused by failure of the program or the microcontroller to execute a program, will cause the watchdog to reset the microcontroller which ensures that the system is immune from a power brownout failure and ESD failures. The status indicators used in the controller block are LED readouts allowing the user to monitor the activity of the controllers, to identify errors and generally check it's progress. Typically, there are five indicators currently used to generate relevant signals: 1. power on self test okay which is a green LED; 2. primary network communications activity; 3. primary network communications errors; 4. secondary network communications activity; and 5. secondary network communications errors.

Mastercontroller

The mastercontroller is connected to the PC through standard RS232-C communications protocol to allow the PC to pass control parameters and provide the owner with the opportunity to program and modify mastercontroller, controllers and thermostats. It is the primary network connection to the PC.

In the event of a remote PC, a connection between the remote PC and mastercontroller may be performed through standard RS232-C communications protocol enabling the user to pass control parameters and allow the program owner to modify the mastercontroller, controllers and thermostats. This auxiliary RS232 communications approach allows for the use of a modem for off site PC's.

The embodiments of the invention in which an exclusive property of privilege is claimed are defined as follows:

1. An energy management system for use in a multi-room building, comprising:

a plurality of electronic thermostats, each said thermostat being adapted to be located in one of said rooms for controlling the ambient temperature in said room, each said thermostat having:

temperature sensor means for producing an electrical signal representative of the ambient temperature in said room;

memory means having a thermostat configuration table for storing user specified parameters and status conditions respecting said room and for storing an algorithm for controlling said ambient temperature, said parameters and status conditions including the value of the maximum and the minimum ambient temperatures for said room, the occupancy status of said room, a bias temperature value for said room, a cooling unit status condition, a heating unit status condition, a default set temperature value, a peak load value, a maximum room temperature value, a minimum room temperature value, a pay television status condition, a theft protection status condition and a hysteresis value, said memory means further including a "maid in room" register, a "maid left room" register, a "room inspected" register, and a "theft flag" register;

occupant input means including first input means for enabling a room occupant to input a temperature increase or decrease signal, second input means for enabling a room occupant to input a "maid in room" condition, third input means for enabling a room occupant to input a "maid left room" condition, and fourth input means for enabling a room occupant to input a "room inspected" condition;

an output terminal bank for connecting said thermostat to a heating unit, a cooling unit, at least one circuit to be monitored for theft or electrical components connected thereto, and a circuit for energizing and de-energizing a pay television circuit;

a serial port for receiving and transmitting digital signals therealong;

timer means for producing at least one timer interrupt signal;

microprocessor means operatively connected to said memory means for loading and operating said algorithm, said microprocessor being operable to:

a) monitor said theft protection circuit and deliver a theft alarm signal to said serial port when the status of said theft circuit changes to a theft condition;

b) monitor said serial port for an incoming data dump signal and being responsive thereto to transmit the contents of said registers to said serial port and then resetting said registers, an incoming program reload signal to replace said algorithm with a new algorithm received at said serial port, and a data load signal for updating said thermostat configuration table;

c) monitor said occupant input means and being responsive to a temperature increase or decrease signal by comparing the request temperature change against predetermined temperature limits in said configuration table and, if the request change is within said limits, to generate and deliver heating and/or cooling control signals to said output terminal bank whereby to cause said heating unit and/or said cooling unit to be activated or de-activated;

d) set said "maid in room" register when said second input means is activated;

e) set said "maid left" register when said third input means is activated;

f) set said "room inspected" register when said fourth input means is activated; and g) respond to a timer interrupt signal by processing a peak load management algorithm and/or a cooling cycle algorithm;

at least one thermostat control device having a serial port in communication with said serial port of at least a predetermined number of said thermostats, memory means for storing a configuration table for each said thermostats of said predetermined number of said thermostats, the contents of said registers of said predetermined number of said thermostats, and an algorithm for controlling the operation of said thermostat control device, timer means for producing a timeout condition at predetermined time intervals, and microprocessor means operable under the control of said algorithm, said thermostat control device being operable to:

a) monitor said serial port and set a signal receive indicator when a signal is received thereat;

b) monitor said timer means for a timeout condition and activating a peak load management algorithm when said timeout condition is detected and activating any acceptable thermostat requests;

c) poll each said thermostats of said predetermined number of said thermostats for and recording changes in said registers and status conditions;

d) respond to a request for a data download command received at said serial port by transmitting a data load signal and fresh data to all or specified ones of said thermostats of said predetermined number of said thermostats; and e) respond to a request for a program reload command by transmitting a program reload signal and a new program to all or specified ones of said thermostats of said predetermined number of said thermostats;

at least one master control device having a serial port in communication with the serial port of one or more of said thermostat control device, memory means for storing a configuration table for each said thermostats of said predetermined number of said thermostats, the contents of said registers of said predetermined number of said thermostats, and an algorithm for controlling the operation of said master control device, timer means for producing a timeout condition at predetermined time intervals, and microprocessor means operable under the control of said algorithm, said thermostat control device being operable to:
 a) monitor said master control device serial port and set a signal receive indicator when a signal is received thereat;
 b) poll each said thermostat control devices for and recording changes in said registers and status conditions;
 c) respond to a request for a data download command received at said serial port by transmitting a data load signal and fresh data to all or specified ones of said thermostat control devices; and
 d) respond to a request for a program reload command by transmitting a program reload signal and a new program to all or specified ones of said thermostat control devices; and a central computer having a central processing unit, a display screen and a keyboard for communicating with a user, and a serial port connected to said serial port of each said master control devices, and memory means for storing an algorithm and having a system configuration table for storing user specified information respecting each said thermostats, said thermostat control devices and said master control devices, and timer means for producing timeout signals at predetermined intervals, said central computer being operable to continuously:
 a) monitor said keyboard for a interrupt signal and responding to a user request; and
 b) polling each said master control devices for a data dump therefrom, checking the data received from each said master control devices for changes therein, updating said memory means, said central computer being responsive to user specified data reload and program reload commands to cause updated data or program files to be transmitted to each said master control devices for retransmission to each said thermostat control devices and for further re-transmission to each said thermostats.

* * * * *

UNITED STATES PATENT AND TRADEMARK OFFICE
CERTIFICATE OF CORRECTION

PATENT NO. : 5,682,949
DATED : November 4, 1997
INVENTOR(S) : Ratcliffe, et. al.

It is certified that error appears in the above-identified patent and that said Letters Patent is hereby corrected as shown below:

In Column 1, Line 12, please change "mount" to --amount--.
In Column 5, Line 66, please change "hi-directional" to --bi-directional--.
In Column 7, Line 39, please change "ash" to --asks--.

Signed and Sealed this

Sixth Day of April, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO. : 5,682,949
DATED : November 4, 1997
INVENTOR(S) : Ratcliffe et al.

It is certified that error appears in the above-indentified patent and that said Letters Patent is hereby corrected as shown below:

Title page, item [56],
<u>Under "References Cited,"</u> please list the following:

```
    U.S. PATENT DOCUMENTS
4,336,462     6/1982      Hedges et al.
4,602,343     7/1986      Dougherty
4,775,944    10/1988      Nakamura
4,804,938     2/1989      Rouse et al.
4,847,781     7/1989      Brown, III et al.
4,847,782     7/1989      Brown, Jr. et al.
4,860,950     8/1989      Reeser et al.
    FOREIGN PATENT DOCUMENTS
1,247,212    12/1988      Canada
0,338,912    10/1989      EPO
0,344,609     5/1989      EPO
2,183,068     5/1987      Great Britain
2,606,524     5/1988      France
```

Signed and Sealed this

Twenty-first Day of September, 1999

Attest:

Q. TODD DICKINSON

*Attesting Officer*     *Acting Commissioner of Patents and Trademarks*